United States Patent
Singh et al.

(10) Patent No.: US 12,026,788 B2
(45) Date of Patent: Jul. 2, 2024

(54) INTELLIGENT EXPENSE REPORT DETERMINATION SYSTEM

(71) Applicant: MASTERCARD INTERNATIONAL INCORPORATED, Purchase, NY (US)

(72) Inventors: Karamjit Singh, Gurugram (IN); Bhargav Pandillapalli, Atmakur (IN); Tanmoy Bhowmik, Bangalore (IN); Deepak Bhatt, Dehradun (IN); Ganesh Nagendra Prasad, West New York, NJ (US); Srinivasan Chandrasekharan, Princeton, NJ (US)

(73) Assignee: Mastercard International Incorporated, Purchase, NY (US)

( * ) Notice: Subject to any disclaimer, the term of this patent is extended or adjusted under 35 U.S.C. 154(b) by 411 days.

(21) Appl. No.: 17/330,746

(22) Filed: May 26, 2021

(65) Prior Publication Data

US 2022/0012817 A1     Jan. 13, 2022

(30) Foreign Application Priority Data

Jul. 8, 2020    (IN) .............................. 202011029062

(51) Int. Cl.
| | |
|---|---|
| *G06Q 40/12* | (2023.01) |
| *G06F 18/214* | (2023.01) |
| *G06F 18/2413* | (2023.01) |
| *G06N 3/08* | (2023.01) |
| *G06Q 20/40* | (2012.01) |

(52) U.S. Cl.
CPC ......... *G06Q 40/12* (2013.12); *G06F 18/2155* (2023.01); *G06F 18/24137* (2023.01); *G06N 3/08* (2013.01); *G06Q 20/4016* (2013.01)

(58) Field of Classification Search
None
See application file for complete search history.

(56) References Cited

U.S. PATENT DOCUMENTS

| | | | | |
|---|---|---|---|---|
| 6,311,041 | B1 * | 10/2001 | Goodyear | G09B 7/02 434/350 |
| 7,912,735 | B1 * | 3/2011 | Akin | G16H 10/60 705/2 |
| 7,974,892 | B2 * | 7/2011 | Fredericks | G06Q 20/24 705/40 |

(Continued)

*Primary Examiner* — Fateh M Obaid
(74) *Attorney, Agent, or Firm* — Barta Jones, PLLC

(57) ABSTRACT

Aspects of the disclosure provide a computerized method and system that utilizes reference expense reports to build and train one or more neural network learning models that intelligently determine the riskiness of to-be-determined expense reports submitted for reimbursement. In examples, a determined riskiness may inform a reimbursement entity manager when determining whether to approve, reject, and/or flag for further review a to-be-determined expense report. In instances, computerized expense report resolution systems and methods may be further automated in order to omit user interactions with to-be-determined expense reports, such that an intelligent computer determines whether to approve, reject, and/or flag a to-be-determined expense report based on the intelligently determined riskiness of the to-be-determined expense report.

20 Claims, 7 Drawing Sheets

(56) References Cited

U.S. PATENT DOCUMENTS

| | | | |
|---|---|---|---|
| 2003/0189600 A1* | 10/2003 | Gune | G06Q 10/10 |
| | | | 715/810 |
| 2006/0229896 A1* | 10/2006 | Rosen | G06Q 10/1053 |
| | | | 705/321 |
| 2012/0185368 A1* | 7/2012 | Schloter | G06Q 40/00 |
| | | | 705/30 |
| 2013/0218615 A1* | 8/2013 | Fredericks | G06Q 40/12 |
| | | | 705/6 |
| 2014/0222493 A1* | 8/2014 | Mohan | G06Q 10/06316 |
| | | | 705/7.26 |
| 2015/0242104 A1* | 8/2015 | Stokman | G11B 27/031 |
| | | | 707/706 |
| 2018/0225280 A1* | 8/2018 | Dugan | G06N 20/20 |
| 2019/0385110 A1* | 12/2019 | Pellafone | G06Q 10/105 |
| 2020/0074359 A1* | 3/2020 | Subramanian | G06N 5/02 |
| 2021/0073735 A1* | 3/2021 | Wang | G06Q 40/12 |
| 2021/0073922 A1* | 3/2021 | Wang | G06Q 40/12 |
| 2022/0012817 A1* | 1/2022 | Singh | G06N 3/045 |

\* cited by examiner

400

```
┌─────────────────────────────────────────────────────────────────────────┐
│ RECEIVING AN UNBALANCED SAMPLE COMPRISING REFERENCE EXPENSE REPORTS     │
│ AND CORRESPONDING ATTRIBUTES, WHEREIN A REFERENCE EXPENSE REPORT        │
│ INCLUDES ONE OR MORE INDIVIDUAL TRANSACTIONS. 402                       │
└─────────────────────────────────────────────────────────────────────────┘
                                    ↓
┌─────────────────────────────────────────────────────────────────────────┐
│ CREATING A BALANCED SUBSAMPLE FROM THE RECEIVED UNBALANCED SAMPLE       │
│ BY CULLING SOME OF THE REFERENCE EXPENSE REPORTS FROM A MAJORITY        │
│ GROUP OF THE UNBALANCED SUBSAMPLE, WHEREIN THE BALANCED SUBSAMPLE       │
│ COMPRISES A NUMBER OF REFERENCE EXPENSE REPORTS WITHIN THE BALANCED     │
│ MAJORITY GROUP THAT IS WITHIN A THRESHOLD BALANCED AMOUNT COMPARED      │
│ TO A NUMBER OF REFERENCE EXPENSE REPORTS WITHIN THE BALANCED            │
│ MINORITY GROUP. 404                                                     │
│  ┌───────────────────────────────────────────────────────────────────┐  │
│  │ CREATING A BALANCED SUBSAMPLE FROM THE MAJORITY GROUP OF THE      │  │
│  │ UNBALANCED SUBSAMPLE BY CLUSTERING INDIVIDUAL TRANSACTIONS OF     │  │
│  │ THE MAJORITY GROUP. 404A                                          │  │
│  └───────────────────────────────────────────────────────────────────┘  │
│                                  ↓                                      │
│  ┌───────────────────────────────────────────────────────────────────┐  │
│  │ SELECTING CLUSTER CENTROIDS, BASED ON DISTANCE FROM A CENTROID,   │  │
│  │ AS THE INDIVIDUAL TRANSACTIONS OF THE BALANCED MAJORITY GROUP.    │  │
│  │ 404B                                                              │  │
│  └───────────────────────────────────────────────────────────────────┘  │
│                                  ↓                                      │
│  ┌───────────────────────────────────────────────────────────────────┐  │
│  │ REMOVING NON-SELECTED INDIVIDUAL TRANSACTIONS FROM THE MAJORITY   │  │
│  │ GROUP THEREBY CREATING THE BALANCED MAJORITY GROUP. 404C          │  │
│  └───────────────────────────────────────────────────────────────────┘  │
└─────────────────────────────────────────────────────────────────────────┘
                                    ↓
┌─────────────────────────────────────────────────────────────────────────┐
│ EXTRACTING FEATURE DATA OF AN INDIVIDUAL TRANSACTION OF A REFERENCE     │
│ EXPENSE REPORT OF THE EXPENSE OF THE UNBALANCED SAMPLE BASED ON         │
│ ATTRIBUTES CORRESPONDING TO THE REFERENCE EXPENSE REPORT. 405           │
└─────────────────────────────────────────────────────────────────────────┘
                                    ↓
            ╱───────────────────────────────────────╲
            ╲      ANY MORE INDIVIDUAL              ╱
     YES    ╱  TRANSACTIONS OF ANY REFERENCE        ╲
  ←─────────╲ EXPENSE REPORT OF THE BALANCED SUBSAMPLE LACKING
            ╱      EXTRACTED FEATURE DATA?          ╲
            ╲                 408                   ╱
                              ↓ NO
┌─────────────────────────────────────────────────────────────────────────┐
│ BUILDING AT LEAST ONE NEURAL NETWORK MACHINE LEARNING MODEL, BASED AT   │
│ LEAST ON THE EXTRACTED FEATURE DATA. 408                                │
│  ┌───────────────────────────────────────────────────────────────────┐  │
│  │ BUILDING A SEQUENTIAL NEURAL NETWORK MODEL. 408A                  │  │
│  └───────────────────────────────────────────────────────────────────┘  │
│  ┌───────────────────────────────────────────────────────────────────┐  │
│  │ BUILDING A CONVOLUTIONAL NEURAL NETWORK MODEL 408B                │  │
│  └───────────────────────────────────────────────────────────────────┘  │
│  ┌───────────────────────────────────────────────────────────────────┐  │
│  │ BUILDING A LOOKALIKE NEURAL NETWORK MODEL 408C                    │  │
│  └───────────────────────────────────────────────────────────────────┘  │
└─────────────────────────────────────────────────────────────────────────┘
                                    ↓
```

FIG. 4A

INTELLIGENT EXPENSE REPORT DETERMINATION SYSTEM

CROSS REFERENCE TO THE RELATED APPLICATIONS

This application claims the benefit and priority of Indian Patent Application No. 202011029062, filed Jul. 8, 2020, entitled "INTELLIGENT EXPENSE REPORT DETERMINATION SYSTEM", the entirety of which is incorporated herein by reference.

BACKGROUND

The volume of expense reports is growing causing latencies between expense report submission and expense reimbursement, which causes account payables to grow and frustrates reimbursement requesting employees. Further, the growing volume of expense reports has caused an increase in fraud as traditional expense report determination systems are overwhelmed by the volume and variety of information included within typical expense reports. Further still, machine training of computers to manage the increasing volume of expense reports has previously been unsuccessful at least because typical expense reports are incompatible with conventional machine training techniques.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized system for intelligently training a computer to perform expense report determinations. The computerized system comprises at least one memory; and at least one processor coupled to the at least one memory. The at least one processor adapted to at least receive an unbalanced sample comprising a plurality of reference expense reports of differing amounts of individual transactions, and attributes corresponding to respective reference expense reports of the plurality of reference expense reports. The unbalanced sample is imbalanced due to comprising a majority group of reference expense reports having a common approval history, and a minority group of reference expense reports having a common rejected history, wherein the majority group comprises a threshold disproportionate amount of reference expense reports as compared to the minority group. The at least one processor is also adapted to create a balanced subsample from the unbalanced sample by culling select reference expense reports of the majority group, wherein the balanced subsample comprises a balanced majority group having a number of reference expense reports within a threshold balanced amount as compared to a number of reference expense reports within the minority group. The at least one processor executes a feature extractor, which is adapted to at least extract feature data of the individual transactions of the reference expense reports of the balanced subsample based on the attributes corresponding to respective reference expense reports. Further, the at least one processor builds at least one neural network learning model based at least on the extracted feature data and trains the at least one neural network learning model to receive, as input, a to-be-determined expense report and the reference expense reports of the balanced subsample. Based on the training, the at least one processor determines a risk score indicative of a probability that the to-be-determined expense report will be rejected as having error data, and creates an interactive recommendation that displays the determined risk score of the to-be-determined expense report, wherein the interactive recommendation accepts, as input, an indication that the to-be-determined expense report is approved, rejected, or flagged.

Further, an example computerized method for intelligently training a computer to perform expense report determinations is disclosed. The method comprises receiving an unbalanced sample that comprises a plurality of reference expense reports of differing amounts of individual transactions, and attributes corresponding to respective reference expense reports of the plurality of reference expense reports. The unbalanced sample is imbalanced due to comprising: a majority group of reference expense reports having a common approval history, and a minority group of reference expense reports having a common rejected history, wherein the majority group comprises a threshold disproportionate amount of reference expense reports as compared to the minority group. The method further comprising creating a balanced subsample from the unbalanced sample by culling select reference expense reports of the majority group, wherein the balanced subsample comprises a balanced majority group having a number of reference expense reports within a threshold balanced amount as compared to a number of reference expense reports within the minority group and extracting feature data of the individual transactions of the reference expense reports of the balanced subsample based on the attributes corresponding to respective reference expense reports. Further still, the method includes building at least one neural network learning model based at least on the extracted feature data; and training the at least one neural network learning model to receive, as input, a to-be-determined expense report and the reference expense reports of the balanced subsample; based on the training, determining, without user input, a risk score indicative of a probability that the to-be-determined expense report includes error data; and based on the determined risk score, approving, without user input, reimbursement of the to-be-determined expense report.

Further examples include one or more non-transitory computer storage media having computer executable instructions for intelligently controlling resolution seeking inquiries, upon execution by at least one processor, cause the at least one processor to perform at least receiving an unbalanced sample that comprises a plurality of reference expense reports of differing amounts of individual transactions, and attributes corresponding to respective reference expense reports of the plurality of reference expense reports. The unbalanced sample is imbalanced due to comprising: a majority group of reference expense reports having a common approval history, and a minority group of reference expense reports having a common rejected history, wherein the majority group comprises a threshold disproportionate amount of reference expense reports as compared to the minority group. The method further comprising creating a balanced subsample from the unbalanced sample by culling select reference expense reports of the majority group, wherein the balanced subsample comprises a balanced majority group having a number of reference expense reports within a threshold balanced amount as compared to a number of reference expense reports within the minority group and extracting feature data of the individual transactions of the reference expense reports of the balanced subsample based on the attributes corresponding to respective reference expense reports. Further still, the method includes building at least one neural network learning model based at least on the extracted feature data; and training the at least one neural network learning model to receive, as input, a to-be-determined expense report and the reference expense reports of the balanced subsample; responsive to the training, determining a risk score indicative of a probability that the to-be-determined expense report will be approved or rejected based on error data; and creating an interactive recommendation that displays the determined risk score of the to-be-determined expense report, wherein the interactive recommendation accepts, as input, an indication that the to-be-determined expense report is approved, rejected, or flagged.

BRIEF DESCRIPTION OF THE DRAWINGS

The present description will be better understood from the following Detailed Description read in light of the accompanying drawings, wherein:

FIGS. 4A and 4B are flow charts illustrating a computerized method for intelligently performing expense report determinations according to an example;

Corresponding reference characters indicate corresponding parts throughout the drawings. In FIGS. 1 to 3 and 6, the systems are illustrated as schematic drawings. The drawings may not be to scale. The features and functions of FIGS. 4-5 are configured to operate with any systems of FIGS. 1 to 3 and 6.

DETAILED DESCRIPTION

Figure 1:
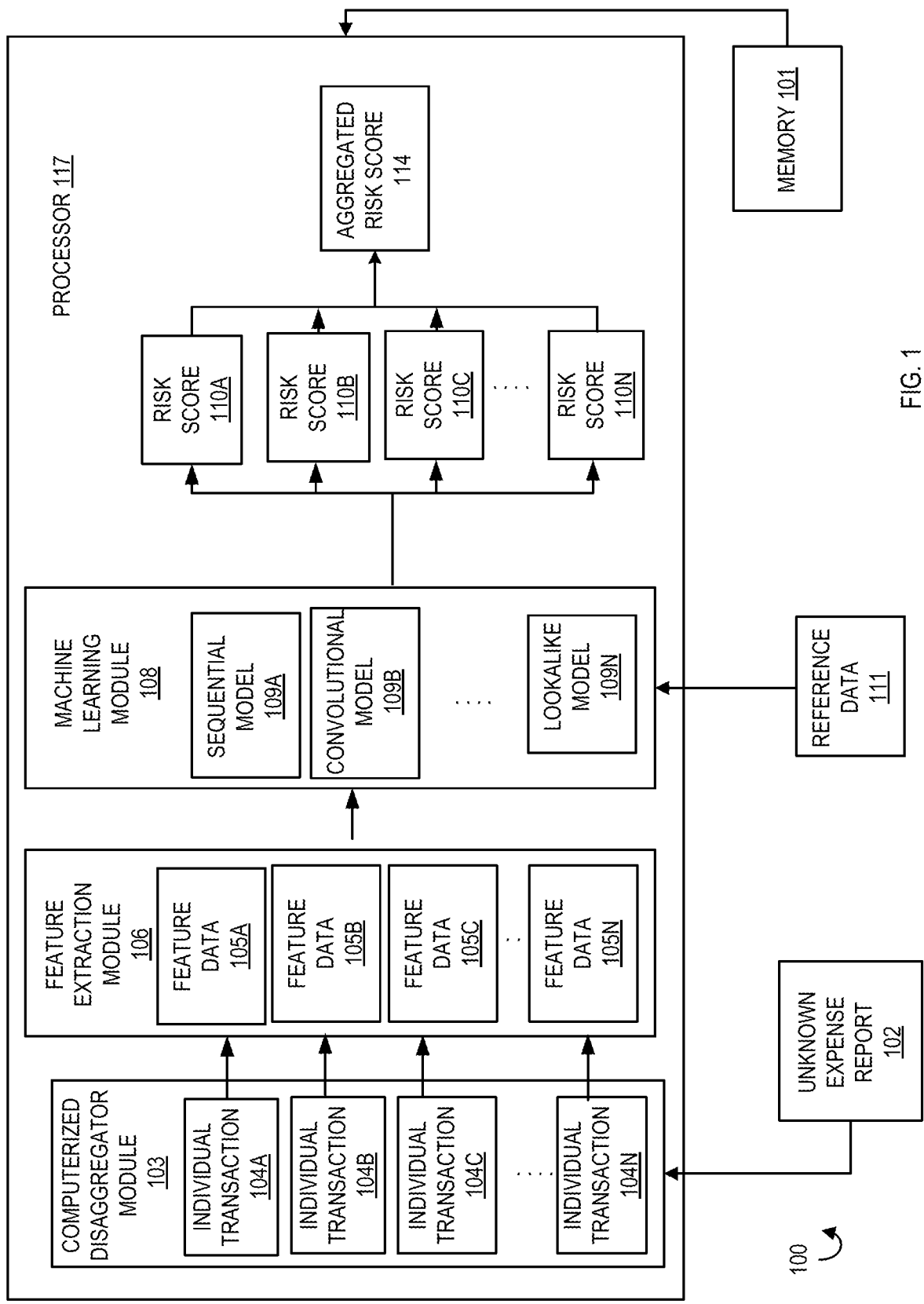
FIG. 1 is a block diagram illustrating a computerized system configured for intelligently performing expense report determinations according to an example.

Systems and methods herein provide the ability for a computer application to assess the risk score of a to-be-determined expense report. Using machine training, the computer application improves traditional expense report determination systems by speeding up the task of approving or rejecting to-be-determined expense reports. In example systems, a person submits an expense report, the computer application extracts the features of the expense report, and a machine learning model processes the extracted features to determine a risk score for the expense report. The risk score is sent to a manager, who uses the risk score to approve or reject the to-be-determined expense report. In instances, the manager is omitted from the approval or rejection determination, and the computer application approves or rejects the to-be-determined expense report without involving the manager.

Aspects of the disclosure provide computerized methods and systems that train computers to determine whether to approve, reject, and/or flag expense reports independent from user interaction. Further, example computerized mechanisms score risk metrics of expense reports. In examples, machine learning models and/or more advanced deep learning based models are trained using reference expense reports and/or reference individual transactions. An expense report or individual transaction is a reference expense report or reference individual transaction when that report/transaction has an approval or rejection history (e.g., has previously been labeled as approved or rejected). In contrast, an expense report or individual transaction is a to-be-determined expense report or to-be-determined individual transaction when an approval or rejection history has not yet been attached to the report/transaction (e.g., has not yet been labeled as approved or rejected). A computer applies an example trained model to a to-be-determined expense report to determine whether to approve, reject, and/or flag the to-be-determined expense report and/or individual transactions thereof.

Systems and methods described herein improve the functionality of devices handling traditional expense report determination systems at least by converting incompatible data of traditional expense reports into data that is compatible with machine training. Based on the created data that is compatible with machine training, machine learning models are built and trained, which determine whether to recommend approval, rejection, and/or further review of to-be-determined expense reports. This uses less computing resources, such as memory and processing, thereby improving the functioning of the underlying computing device. Additionally, or alternatively, machine learning models are built and trained to approve, reject, and/or flag expense reports and/or individual transactions thereof, independent from user interaction, which improves the functioning of traditional expense report determination processing or computing systems at least by reducing traditional determination processing latencies leading to improved accounting systems and improved user experiences.

Systems and methods described herein improve traditional expense report determination systems at least by increasing the technical accuracy of approval and rejected determinations, which prevents the loss of assets caused by erroneous approvals and further reduces latencies, computer processing, and network traffic dedicated to correcting inaccurate approvals and/or rejections. Conventional expense report determination systems are further improved by the systems and methods provided herein because dynamic models are continually improved via feedback data, which adapts machine trained models to learn current trends as feedback data is received.

Further still, typical expense report determination systems are improved by examples described herein because machine trained models are personalized to an individual system and/or user thereof as the volume of the individual system's and/or user's expense reports increases. Such an improvement is distinguishable from experiences created by conventional expense report determination systems because conventional expense report determination systems denigrate with an increase of expense report volume while example systems and methods disclosed herein improve with an increase of expense report volume.

An expense report includes a request for reimbursement of one or more individual transactions. Expense reports are submitted from a requesting entity (e.g., employee, subcontractor, contractor, vendor, merchant, subsidiary, and/or the like) to a reimbursing entity (e.g., employer, general contractor, contractor, vendor, merchant, and/or the like) requesting reimbursement for any type of expenditure including, but not limited to, worked hours, worked days, utilized discounts, services rendered, products dispensed, money spent, miles driven, and/or the like. Likewise, a requesting entity may be reimbursed via various forms of reimbursement, including by not limited to, hours off, days off, discounts, services, products, money, and/or the like.

Expense reports may comprise any number or quantity of individual transactions. A reimbursing entity evaluates individual transactions of a submitted expense report to determine whether or not to reimburse the requesting entity for individual transactions therein. When all individual transactions are approved for reimbursement, an expense report is approved at the report level. When one or more individual transactions are rejected for reimbursement, an expense report may be rejected at the report level. Report level information is information descriptive of the report as a whole, and report level evaluations evaluate the report as a whole. In instances, the requesting entity corrects error data that caused rejection of the expense report and resubmits the expense report. In examples, when all individual transactions of the resubmitted expense report are approved for reimbursement, the resubmitted expense report is approved at the report level.

An expense report is considered a reference expense report when an expense report is stored with an indication of having been approved or rejected, referred to as an approval or rejection history. An expense report is rejected at least because one or more of the individual transactions is determined to include error data. Error data is data that fails to meet reimbursement rules defined by the reimbursing entity. Reimbursement rules define one or more conditions, which when satisfied or violated, cause an individual transaction and/or expense report to be approved or rejected. An individual transaction and/or expense report that fails to satisfy the reimbursement rules of the reimbursing entity comprises error data. An individual transaction and/or expense report comprising error data is rejected based at least on the error data therein.

Reimbursement entities may define entity specific reimbursement rules. For example, a reimbursement entity may define one or more conditions, such as one or more time periods within which an individual transaction must be included within an expense report, defining one or more time periods within which an individual transaction must originate, defining one or more locations within which an individual transaction must originate (e.g., zip code, city, state, country, and/or the like), defining a preapproval requirement, defining one or more identities of one or more entities associated with an individual transaction (e.g., the transaction originators, such as the reimbursement requestor's identity, store, vendor, and/or airline company identity, an identity of a client and/or recruit associated with an individual transaction, and/or the like), defining currency amount ranges (e.g., United States Dollar (USD) amount ranges, Singapore Dollar (SGD) amount ranges, and/or the like), and/or any other conditions.

Further examples of reimbursement rules include rules having one or more comparison conditions (e.g., x<y) and/or combined conditions (e.g., a+b+c<y). Examples include defining a radial distance from a defined location within which an individual transaction originates (e.g., airport, convention center, hotel, office, travel route, and/or the like), defining a threshold amount spend as conditioned on a number of people included within a set of preapproved activities, and/or any other conditions (e.g., event conditions, equipment conditions, location conditions, client condition, activity condition, preapproval conditions, and/or the like).

An individual transaction of an expense report includes error data at least when the individual transaction fails to satisfy or violates conditions of a reimbursement rule. In an example, a reimbursement rule is defined such that when an individual transaction originates with two (2) days of a conference being held on a specific date (mm/dd/yyyy), originates within nine (9) radial miles of the location of the conference location or along a travel route to the conference location, and meets the currency amount range of $1 (USD)-$50 (USD), the individual transaction is approved. Otherwise, the individual transaction is rejected. An example individual transaction that fails to satisfy the example reimbursement rule is an individual transaction that originated on a date that is five (5) days from the date the conference was held. Furthering the example, an individual transaction that fails to satisfy the example reimbursement rule when the individual transaction originates more than nine (9) miles from the conference location or a travel route to the conference location and/or when the individual transaction expenditure is greater than $50 (USD). Responsive to the above example individual transaction failing to satisfy or violating conditions of the above example reimbursement rule, the failing individual transactions are determined to include error data. Further, an expense report comprising one or more of the individual transactions determined to have error data is rejected at the report level.

FIG. 1 is a block diagram illustrating example a computerized system 100 configured for intelligently performing expense report determinations. In instances, computerized system 100 determines risk scores 110a-110n of individual transactions 104a-104n of a to-be-determined expense report 102, which may inform an approve, reject, and/or flagging determination of one or more individual transactions 104a-104n. Further, computerized system 100 aggregates some or all individual risk scores 110a-110n, which may inform an approve, reject, and/or flagging determination at the report level. Computerized system 100 includes local and/or remote memory 101 comprising computer executable code causing one or more processors 117 to execute operations of computerized disaggregator system 103, feature extraction system 106, and machine learning system 108. One or more system as described herein may include one or more modules, components, elements, and/or the like."

Computerized disaggregator system 103 receives to-be-determined expense report 102 and disaggregates individual transactions thereof into separate individual transactions 104a-104n. Feature extraction system 106 receives individual transactions 104a-104n and extracts corresponding feature data from each individual transaction, for example, feature data 105a corresponding to individual transaction 104a, feature data 105b corresponding to individual transaction 104b, feature data 105c corresponding to individual transaction 104c, and feature data 105n corresponding to individual transaction 104n.

Machine learning system 108 includes one or more neural network models, such as sequential model 109a, convolutional model 109b, and/or lookalike model 109n, which were built and trained as described in further detailed herein. Machine learning system 108 receives reference data 111 and individual transactions 104a-104n with their corresponding feature data 105a-105n as input for one or more neural network models and executes the one or more neural network models to determine a risk score of each individual transaction, for example, risk score 110a of individual transaction 104a, risk score 110b of individual transaction 104b, risk score 110c of individual transaction 104c, and risk score 110n of individual transaction 104n.

In examples, risk scores 110a-110n, alone or together, may be utilized to determine whether to approve, reject, and/or flag their corresponding individual transactions 104a-104n, as is detailed further herein. Further, one or more processors 117 may aggregate some or all risk scores 110a-110n to determine aggregated risk score 114, which may be utilized when determining whether to approve, reject, and/or flag a to-be-determined expense report 102 at the report level, which is also described further herein.

Figure 2:
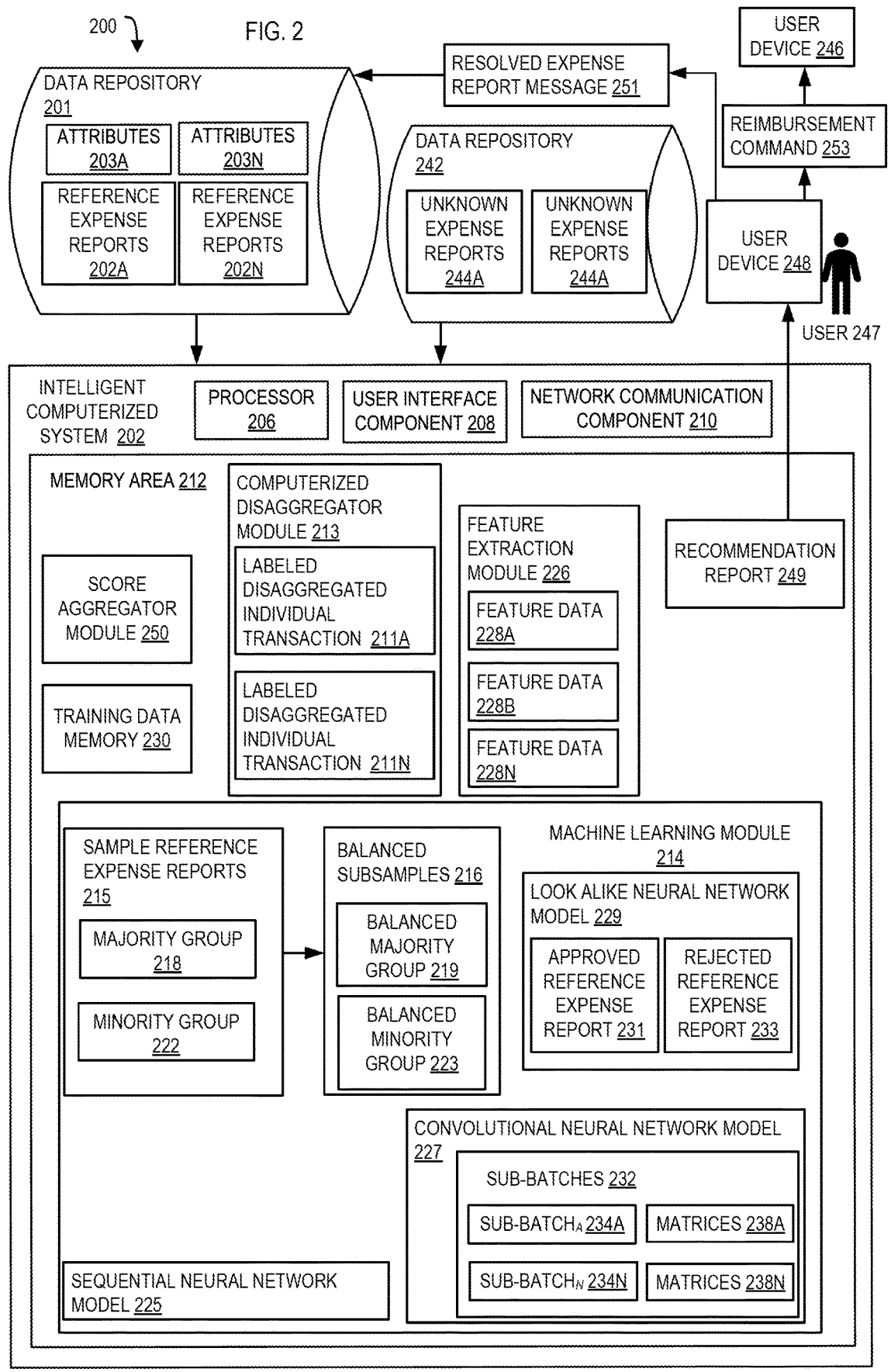
FIG. 2 is a block diagram illustrating a networked computerized system configured for intelligently performing expense report determinations according to an example.

FIG. 2 is a block diagram illustrating an example network computerized system 200 as configured for intelligently performing expense report determinations. Data repository 201 stores a plurality of reference expense reports 202a-202n. A reference expense report is an expense report that was previously approved or rejected. In examples, data repository 201 stores one or more reference expense reports 202a-202n in association with attributes 203a-203n. For instance, expense report 202a is stored in association with attributes 203a. Example attributes 203a include report level information, for example, submission date, submission time, submission amount, requesting entity, reimbursing entity, whether or not receipts were submitted, an approved or rejected history, and/or annotation comments including reasons a reference expense report was approved or rejected.

Example computerized system 200 also includes intelligent computerized system 202, which includes local and/or remote components including at least one processor 206, user interface component 208, and network communication component 210. Processor 206 communicates with at least one local and/or remote non-transitory memory area 212, which at least stores computer executable code causing processor 206 to perform operations. Network communication component 210 is in communication at least with data repository 201, and processor 206 receives at least one sample of reference expense reports 215 via network communication component 210. A sample of reference expense reports 215 may comprise all expense reports stored in data repository 201 or subset portion thereof. For instance, sample of reference expense reports 215 may include reference expense reports of a single reimbursing entity, a combination of reimbursing entities, a single requesting entity, a combination of requesting entities, and/or the like.

Conventional machine training has been unable to determine whether to approve to reject a to-be-determined expense report 224a at least because machine analysis of individual transactions within to-be-determined expense report 224a has not been available. As explained, reference expense reports are approved or rejected at the report level. As such, data obtained from reference expense reports lack sufficient detail about individual transactions therein to form training data for transaction level determinations. A transaction level analysis determines whether or not an individual transaction should be approved, rejected, and/or otherwise resolved. Transaction level information is information about an individual transaction of an expense report. The lack of transaction level training data prevents traditional machine training systems and methods from being trained to determine whether to approve or reject a to-be-determined expense report 224a because traditional machine training systems and methods lack the ability to analyze the individual transactions of to-be-determined expense report 224a.

Systems and methods described herein improve machine training systems and methods by overcoming the transaction level training data deficiency problem described herein at least by including a computerized disaggregator system 213 within intelligent computerized system 202. Memory area 212 comprises computer executable code causing processor 206 to execute operations of computerized disaggregator system 213, which converts reference expense reports labeled disaggregated individual transactions 211a-211n, (which may be stored as transaction level training data) by disaggregating and labeling individual transactions of respective reference expense reports 202a-202n.

Figure 3:
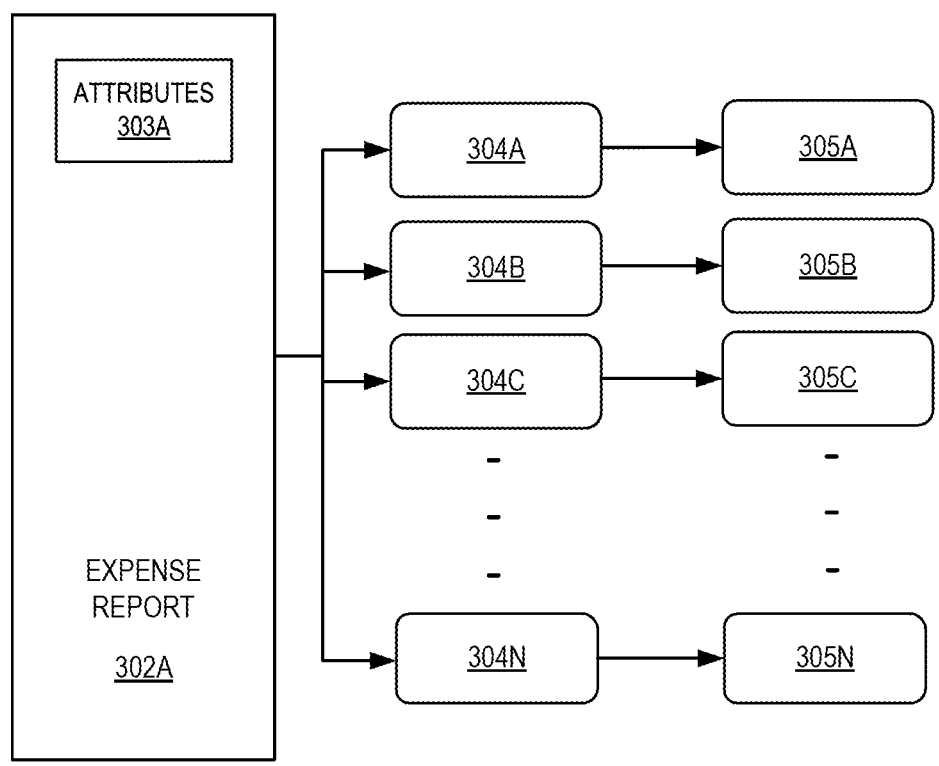
FIG. 3 is a block diagram illustrating creating transaction level training data according to an example.
Figure 3:
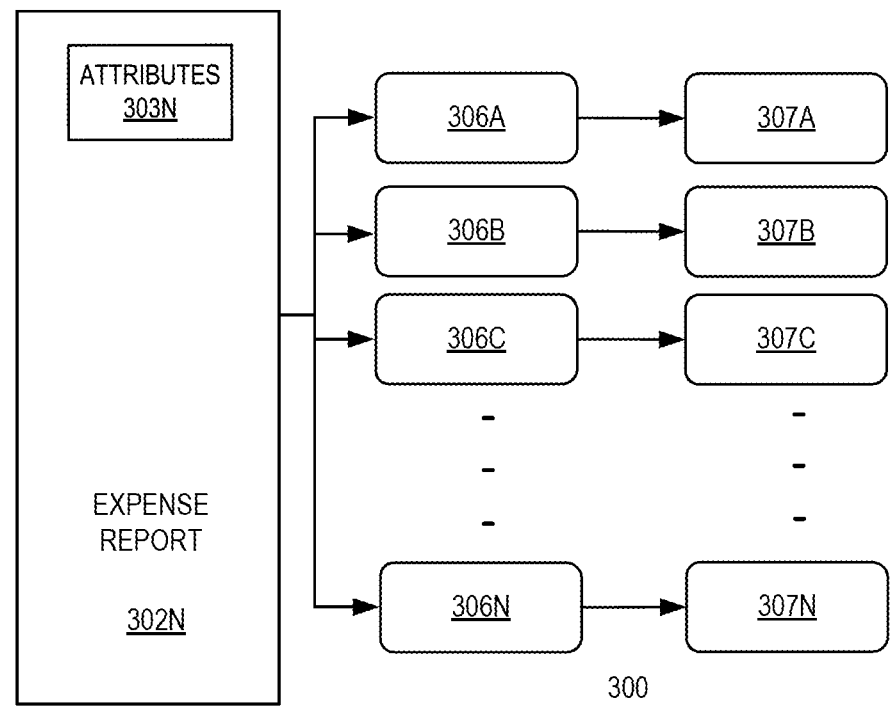

FIG. 3 is a block diagram 300 illustrating an example of creating transaction level training data. Exemplary reference expense reports 302a-302n and corresponding attributes 303a-303n are received by processor 206. Processor 206 disaggregates individual transactions 304a-304n from reference expense report 302a and disaggregates individual transactions 306b-306n from reference expense report 302n. Further, processor 206 labels disaggregated individual transactions 304b-304n based on corresponding attributes 203a thereby creating labeled disaggregated individual transactions 305a-305n. Likewise, processor 206 labels disaggregated individual transactions 306b-306n based on corresponding attributes 203n thereby creating labeled disaggregated individual transactions 307a-307n.

Processor 206 determines a label for a disaggregated individual transaction 304a based on approval or rejection history of attributes 203a. For instance, attributes 203a include rejection history indicating that reference expense report 302a was rejected at the report level. Based on the report level rejection history, disaggregated individual transactions 304a-304n are labeled as rejected at the transaction level. Similarly, processor 206 labels disaggregated individual transactions 306a-306n as approved at the transaction level based on the report level approval history indicated by attributes 203n of reference expense report 302n. Labeled disaggregated individual transactions 305a-305n and 307a and 307n may be stored in local and/or remote memory (e.g., training data memory 230) as labeled transaction level training data.

Systems and methods described herein further improve machine training systems and methods by further overcoming the transaction level training data deficiency problem described herein at least by including a feature extraction system 226 within intelligent computerized system 202. Memory area 212 includes computer executable code causing processor 206 to execute operations of Feature extraction system 226, which converts report level attributes into a different type of data, e.g., transaction level feature data 228a-228n.

Feature data 228a-228n is extracted from attributes 203a-203n for labeled disaggregated individual transactions 305a-305n and 307a-307n. For example, Feature extraction system 226 extracts feature data 228a for labeled disaggregated individual transaction 305a from attributes 203a. Attributes 203a-203n may include transaction level information in addition to the report level information described herein. Example transaction level attributes may include a transaction code (e.g., debit, credit, check, cash, and/or the like), vendor or merchant category code, spend information, transaction amount, transaction location, transaction date, transaction time, whether or not a receipt was submitted an individual transaction, and/or the like.

Feature extraction system 226 uses one or more transaction level or report level attributes (e.g., 203a) of one or more individual transactions to extract feature data (e.g., 228a) for a labeled disaggregated individual transaction (e.g., 305a). Feature data is transaction level descriptive information about a labeled disaggregated individual transaction. For instance, feature data 228a extracted for labeled disaggregated individual transaction 307a may include, a time difference between submission of reference expense report 302a and rejection of reference expense report 302a, a report level average amount, report level minimum amount, and/or report level maximum amount of spent dollars submitted in reference expense reports 202a-202n, and/or a transaction level average amount, transaction level minimum amount, and/or transaction level maximum amount of spent dollars submitted in reference expense report 202a and/or reference reports 202a-202n. Further examples of feature data 228a include a date difference between transaction dates of two or more individual transactions, a time difference between transaction times of two or more individual transactions, as well as other comparative information such as differences between transaction codes, differences between vendor or merchant category codes, differences between spend information, differences between transaction locations, and/or the like. Feature extraction system 226 may store feature data 228a-228n in one or more local and/or remote memory (e.g., training data memory 230) as feature transaction level training data.

Conventional machine training has also been unable to determine whether to approve or reject a to-be-determined expense reports because reference expense reports are excessively imbalanced. For instance, the number or quantity of approved reference expense reports typically far outnumber the number of rejected reference expense reports or vice-a-versa. Imbalanced training data significantly degrades the accuracy of machine trained models, and the greater the imbalance the greater the inaccuracy. So, the imbalance problem has historically prevented machine trained models from accurately determining whether to approve or reject to-be-determined expense reports.

Systems and methods described herein improve conventional machine training systems and methods by improving the accuracy of machine trained models. Accuracy improvement is achieved via techniques that reduce and/or solve the excessive imbalance problem described herein at least by creating balanced subsamples 216 of reference expense reports 202a-202n.

In examples, memory area 212 comprises computer executable code causing processor 206 to execute operations of machine learning system 214. Machine learning system 214 receives sample of reference expense reports 215 including reference expense reports 202a-202n as well as attributes 203a-203n corresponding thereto. In an example, the number of approved reports disproportionately exceed the number rejected reports. In examples, the reverse may be true and/or some of the attributes 203a-203n may indicate additional report resolutions (e.g., flagged), which may be considered during imbalance resolution.

Disproportionality may be defined as a threshold comparison value, $T_d$. For example, when processor 206 determines that the number of received reports of a common history (e.g., approved history, rejected history, and/or flagged history) is $T_d$ greater than the number of received reports of another common history, machine learning system 214 determines that the received sample of reference expense reports 215 is disproportionate. In examples, the reverse may be true, such that the number of received reports of a common history is $T_d$ less than the number of received reports of another common history. In examples, $T_d$ may be defined as any percent including and between 10% and 100%. If desired, $T_d$ may be dynamically selected based on attributes 203a-203n of the received expense reports and/or the total number of received reports, and in examples may be selected based on a sliding scale.

Responsive to the determined disproportionality, machine learning system 214 balances the received reference expense reports. For example, machine learning system 214 groups the received reference expense reports into at least one majority group 218 and at least one minority group 222 based on the common history of the group. Continuing the above example, approved reports are grouped into majority group 218 and rejected reports are grouped into minority group 222 because the number of received approved reports is greater than or equal to $T_d$ more than the number of received rejected reports.

Machine learning system 214 culls reference expense reports from majority group 218 to balance the number of expense reports in majority group 218 with the number of expense reports in minority group 222. Balance may be defined based on $T_d$. In some examples, majority group 218 includes approved expense reports while minority group 222 includes rejected expense reports. Further, in some instances, majority group 218 includes rejected expense reports while minority group 222 includes approved expense reports. When the number of reference expense reports within majority group 219 is $T_d$ greater than the number of reference expense reports within minority group 222, the number of reference expense reports in majority group 219 is balanced with the number of reference expense reports in minority group 222.

In examples, machine learning system 214 culls reference expense reports from majority group 218 by performing Gaussian Mixture Model based clustering using Expectation Maximization on majority group 218. Cluster centroids of majority group 218 are selected for inclusion within balanced majority group 219 while non-selected reference expense reports are excluded from balanced majority group 219. Machine learning system 214 provides a covariance matrix having a full degree of freedom by creating a covariance matrix that includes different variances across the diagonal, which gives the cluster flexibility in terms of shape. Further, an exemplary covariance matrix is created to include nondiagonal elements up to the $2^{nd}$ order, which further improves machine training by avoiding over-learning by restricting covariances up to $2^{nd}$ order. Machine learning system 214 subsamples majority group 218 based on distance from the centroid sampling of each soft cluster. In examples, sampling may be applied to reference expense report from multiple reimbursing entities or reference expense report from a single reimbursing entity. When reference expense reports from multiple reimbursing entities are used, a hyper-parameter may be included to determine which reimbursing entities of the multiple reimbursing entities are clubbed and/or treated separately which improves performance of machine learning model, for example, by customizing the balance majority group 219 based on preferences of a reimbursing entity and/or based on attributes of the majority group 222. Reference expense reports included within balanced majority group 219 and balanced minority group 223 make up balanced subsample 216. Machine learning system 214 may store balanced subsample 216 in one or more in local and/or remote memory (e.g., training data memory 230) as subsample training data.

Such soft clustering improves conventional machine learning systems and methods by creating an efficient representation of the outliers with Gaussians for whom most of the historical data points have minimal cluster membership value. This soft clustering based stratified sampling also improves the performance machine learning models significantly by improving the sensitivity of an example machine learning model while minimally sacrificing specificity. Further, because a false approval of a to-be-determined expense report is more troublesome than false rejection of a to-be-determined expense report, the exemplary sampling further benefits machine learning models used to determine whether to approve or reject to-be-determined expense reports.

Example machine learning models discussed herein may include advanced deep learning machine training in addition to tree-based models. Any of the training data discussed herein may be utilized by Machine learning system 214 when building and/or training example machine learning models. Example machine learning models utilize herein discussed training data in conjunction with a to-be-determined expense report to determine a risk score of the to-be-determined expense report. A risk score may be utilized, by example machine learning models, when determining whether to recommend approval or rejection and/or to skip the approve or reject the to-be-determined expense report.

For instance, machine learning system 214 may build and train sequential neural network models. In examples, a sequential neural network model 225 learns, via training data as discussed herein, the spend history of a requesting entity in a time dependent fashion (e.g., in the order transactions occurred). A learned spend history may include a difference in time of consecutive individual transactions, amounts spent in consecutive individual transactions, locations of consecutive individual transactions, and/or the like as learned from training data. The training data may be limited to the spend history of the requesting entity of the input to-be-determined expense report being evaluated by the sequential neural network model, if desired. An example sequential neural network model utilizes the learned spend history in conjunction with a to-be-determined expense report to determine a risk score of the to-be-determined expense report.

In another example, one or more convolutional neural network models 227 may be built and trained by systems and methods disclosed herein. In examples, the to-be-determined expense report being evaluated is input into a convolutional neural network model as a matrix having rows (or alternatively columns) corresponding to the number of individual transactions of the to-be-determined expense report and columns (or alternatively rows) populated by transaction level feature data (e.g., time, amount, date, and/or other transaction level features as is described herein) that was extracted from the to-be-determined expense report. However, traditional convolutional neural network models are typically unable to determine a risk score of to-be-determined expense report because reference expense reports that would be used for training are incompatible due to the differing amounts of individual transactions within the reference expense reports.

For example, of a plurality of reference expense reports, one or more expense reports may include x number of individual transactions, one or more other expense reports may include y number of individual transactions, and one or more other expense reports may include n number of individual transactions. As such, convolutional neural network models have traditionally not been machine trained from a plurality of expense reports having differing amounts of individual transactions because reference matrices derived therefrom would have mismatched amounts of rows and columns. For instance, a matrix derived from an expense report having x number of individual transactions would have x number of rows while a matrix derived from an expense report having y number of individual transactions would have y number of rows (e.g., x≠y). So, convolutional neural network models have traditionally not been machine trained from expense reports having differing amounts of individual transactions due to the described matrix mismatch problem.

Systems and methods described herein improve traditional convolutional neural network models by overcoming the described matrix mismatch problem at least by sub-batching the reference expense reports used to machine train convolutional neural network models described herein. Memory area 212 comprises computer executable code causing processor 206 to execute operations of machine learning system 214 to sub-batch training data. In examples, machine learning system 214 determines the number of individual transactions included within a reference expense report and batches the reference expense report into a sub-batch that includes other reference expense reports of an equal number of individual transactions.

For instance, reference expense reports having a number of individual transactions are batched with other reference expense reports having a number of individual transactions, such that the reference reports batched into sub-batch, 234a each have the same number of individual transactions. Likewise, reference reports having n number of individual transactions are batched with other expense reports having n number of individual transactions, such that the expense reports batched into sub-batch$_n$ 234n each have the same number of individual transactions.

In examples, sub-batching may be repeated to create sub-batches for some or all the differing amounts of individual transactions of the plurality of reference expense reports (e.g., sub-batch$_n$ 234n). In such examples, sub-batches 234a-234n may be stored as sub-batch training data in one or more local and/or remote memory (e.g., training data memory). Continuing the example, when an example convolutional neural network model 227 receives matrix input of a to-be-determined expense report, machine learning system 214 may determine the size of the input matrix and obtain the sub-batch training data corresponding to the determined size of input matrix. For instance, if the input matrix has a rows, machine learning system 214 obtains sub-batch$_a$ 234a, which has a number of individual transactions per reference expense report, and utilizes matrices 238a of reference expense reports from sub-batch$_a$ 234a in conjunction with the input matrix to determine a risk score of to-be-determined expense report.

In examples, sub-batching the differing amounts of individual transactions of the plurality of reference expense reports may be performed on an as needed basis, and as a sub-batch is created, the sub-batch may be stored as sub-batch training data in one or more local and/or remote memory (e.g., training data memory). Continuing the sub-batching as needed example, when an example convolutional neural network model 227 receives matrix input of a to-be-determined expense report, machine learning system 214 may determine the size of the input matrix. Based on the determined size, machine learning system 214 performs the described sub-batching to create a sub-batch corresponding to the determined size of input matrix. For instance, if the input matrix has n rows, machine learning system 214 performs the sub-batching to create sub-batch$_n$ 234n and utilizes matrices 238n of reference expense reports from sub-batch$_n$ 234n in conjunction with the input matrix to determine a risk score of the to-be-determined expense report. Machine learning system 214 may store sub-batch$_n$ 234n as sub-batch training data in one or more local and/or remote memory (e.g., training data memory 230). Having stored sub-batch$_n$ 234n as training data, when a subsequent to-be-determined expense report having x number of transactions is evaluated, machine learning system 214 may obtain sub-batch$_n$ 234n from training data memory 230 for use in determining a risk score for subsequent to-be-determined expense report. Sub-batching on an as needed basis may save processing and memory resources in the beginning. Further, for to-be-determined expense reports having a number of individual transactions that submitted frequently (e.g., a single individual transaction), latency is reduced because a reference sub-batch is saved for repetitive use.

The amount of reference expense reports included with a sub-batch, referred to herein a batch size, may be adjusted dynamically as per a corpus size of similar transaction volume reports (e.g., based on a number of reference expense reports included in sub-batches of similar size as determined via a threshold). Sub-batches of adjustable batch size include an extra variable batch size parameter as a normalizing step in stochastic gradient decent update.

In some examples, balanced subsamples 216 may comprise an insufficient number of reference expense reports therein to build and train an accurate sequential neural network model 225 and/or convolutional neural network model 227, for example as compared to an accuracy threshold, $T_a$. In other examples, a reimbursement entity may not have yet accumulated enough reference expense reports to build and train a sequential neural network model 225 and/or convolutional neural network model 227 capable of achieving a desired accuracy threshold, $T_a$, irrespective of sub-batching. Systems and methods herein further improve conventional neural network models by solving this insufficiency problem.

Memory area 212 comprises computer executable code causing processor 206 to execute operations of machine learning system 214 to build a lookalike neural network model 229 with metric based learning, which achieves a defined accuracy threshold, $T_a$, even when minimal amounts of reference expense reports is available for training. In examples, machine learning system 214 receives a reference expense report pair, performs a comparison, and builds/trains a lookalike model based on a determination of whether reference report pair lookalike or not. So, instead of building a classifier based learning model, the present disclosure builds a metric based learning model that looks at a pair of reference expense reports, which may have similar or dissimilar features and/or attributes and builds and trains the model to differentiate between similar training pairs and dissimilar training pairs.

During learning phases, an exemplary model 229 may not necessarily determine whether a first reference expense report of a training pair had been rejected or approved or whether a second reference expense report of the training pair had been rejected or approved. Rather, these exemplary models may learn by determining whether the first reference expense report is similar or dissimilar to the second reference expense report of the training pair.

When two reference expense reports have similar features and/or attributes, both reference expense reports will have been approved or disapproved. Likewise, when two reference expense reports have dissimilar features and/or attributes, one reference expense report of the pair will have been approved, and the other reference expense report will have been rejected. The machine learning system 214 knows approval or rejection histories via attributes 203a of a corresponding reference expense report 202a. So, when building a Siamese based network model, machine learning system 214 creates reference expense report pairs having the same approved/rejected history (e.g., both approved or both rejected) and creates reference expense report pairs having different approved/rejected history (e.g., one approved and the other rejected).

Then, machine learning system 214 trains the model to distinguish between a training pair having the same approved/rejected history based on the training pair having similar features and/or attributes and a training pair having different approved/rejected histories based on the training pair having dissimilar features and/or attributes.

In examples, machine learning system 214 creates one or more training pairs. For example, one such pair may be approved and rejected pairs (A&R pairs). Approved expense reports tend to include less risky traits from which a model can learn and rejected expense reports tend to include more risky traits from which a model can learn. Another pair may be rejected and rejected pairs (R&R pairs), which contain a pair of rejected expense reports both tending to include risky traits from which a model can learn. Further, another pair may be approved and approve pairs (A&A pairs), which comprise a pair of reference expense reports both having approval histories and thus both tending to have less risky traits from which a model can be trained.

Machine learning system 214 labels A&R pairs with a 0, which indicates to lookalike neural network model 229 being trained that the training pair comprises reference expense reports having different approved/rejected histories. Further, machine learning system 214 labels R&R pairs and A&A pairs with a 1, indicating to lookalike neural network model 229 being trained that the training pair comprises reference expense reports of the same approved/rejected histories. The labeled training pairs may be stored in one or more local or remote memory (e.g., training data memory 230) as labeled training pairs. Machine learning system 214 feeds the labeled training pairs and their corresponding attributes and/or features into lookalike neural network model 229 to train the model to distinguish between a pair of reference expense reports having similar attributes and/or features and a pair of reference expense reports having dissimilar attributes and/or features.

After lookalike neural network model 229 is trained via the metric based learning described herein, machine learning system 214 receives to-be-determined expense report 244a, from data repository 242, as input for lookalike neural network model 229. Because machine learning system 214 knows whether a set reference expense reports were approved or rejected based on attributes and/or features corresponding to respective reference expense reports of the set, machine learning system 214 has access to a set of non-risky (e.g., approved) reference expense reports 231 and a set of risky (e.g., rejected) reference expense reports 233. Responsive to machine learning system 214 receiving to-be-determined expense report as input for the metric based model, machine learning system 214 obtains an approved reference expense report and creates an input pair comprising the to-be-determined expense report (as well as the attributes and/or features thereof as determined by feature extraction system 226) and an approved reference expense report (as well as the attributes and/or features thereof). The created pair is fed as an input pair into lookalike neural network model 229, and lookalike neural network model 229 determines an approval similarity value, $V_a$, (e.g., non-risky value), indicating a similarity level between the to-be-determined expense report and the approved reference expense report (e.g., based on a comparison of features and/or attributes thereof). This pairing may be repeated (e.g., in serial and/or parallel) for some or all of the approved reference expense reports in the set of approved reference expense reports 231 to generate an aggregated approval similarity value, $V_A$, according to any aggregation technique discussed herein.

Further, the pairing may be repeated for some or all of the rejected reference expense reports in the set of rejected reference expense reports 233, such that the lookalike neural network model 229 determines a rejected similarity value, $V_n$, and/or aggregated rejected similarity value, $V_N$, indicating a similarity level between the to-be-determined expense report and the rejected reference expense reports (e.g., based on a comparison of features and/or attributes thereof).

In examples, similarity values are compared to determine whether the to-be-determined expense report is more similar to approved reference expense reports or rejected reference expense reports. In examples, when $V_A > V_R$, the to-be-determined expense report is labeled acceptable (e.g., non-risky), and when $V_A < V_R$, the to-be-determined expense report is labeled rejectable (e.g., risky). In examples, $V_A$ and $V_R$ may be used as a confidence score of the determined label.

A to-be-determined expense report may be input into any of the machine learning models described herein built by machine learning system 214, and a respective machine learning model may evaluate a to-be-determined expense report at the report level and/or the transaction level. Post sampling is performed, and models are trained using one of the approaches described herein to learn how to output risk scores and/or how to reject or approve a to-be-determined expense reports or individual transactions thereof. In another aspect of the systems and methods herein, to leverage learnings from multiple machine learning models, systems and methods herein utilize stacked ensembling for enhanced accuracy.

In instances where a to-be-determined report is evaluated at the report level, outputs from a machine learning model will be at the report level. In instances when a to-be-determined report is evaluated at the transaction level, outputs from a machine learning model may be transaction level outputs. In further examples, a to-be-determined report may be received at the report level, disaggregated to the transaction level via computerized disaggregator system 213, output from a machine learning model at the transaction level, and aggregated by a score aggregator that outputs the risk score of the to-be-determined expense report at the report level.

However, in examples, it may be desirable to receive a report level to-be-determined report, perform a transaction level analysis via one or more of the machine learning models described herein, and output a report level risk score and/or determination of approval or rejection. Systems and methods herein further improve conventional machine learning models by including score aggregator system 250, which provides for report level input, transaction level analysis, and report level out.

Memory area 212 comprises computer executable code causing processor 206 to execute operations of score aggregator system 250, which aggregates risk scores (e.g., $V_A$ and/or $V_R$) and/or risk labels of all transactions of a to-be-determined expense report. In instances, a risky label (e.g., rejection label) may be given a numerical value and a non-risky label (e.g. approval label) may be given different numerical values for evaluation by score aggregator system 250.

In examples, when at least a to-be-determined expense report includes a single transaction determined to be risky transaction (e.g., via a risk/rejection label and/or a risk score), the to-be-determined expense report is assigned an aggregate risk score within the risk score range that indicates riskiness and/or rejection (further explained herein). When all transactions of the to-be-determined expense report are determined to be non-risky transactions (e.g., via a non-risky/approval label and/or a risk score), the to-be-determined expense report is assigned an aggregate risk score within the risk score range that indicates non-riskiness and/or approval (further explained herein).

In instances, score aggregator system 250 determines a simple average of the transaction risk scores of a to-be-determined expense report to create an aggregate risk score for the to-be-determined expense report. An aggregate risk score is assigned to the to-be-determined report as an indication of the risk level of the to-be-determined expense report (further explained herein).

Further, a weighted average of transaction risk scores may be determined to create an aggregate risk score for a to-be-determined report, wherein score aggregator system 250 weights individual transactions of the to-be-determined report based on extracted features (via feature extraction system 226) of the individual transactions therein. For example, individual transactions of increasing amounts of dollars spent may be increasingly weighted because a false approval of a larger amount of dollars spent is riskier than a false approval of a smaller amount of dollars spent.

In examples, intelligent computerized system 202 executes a recommendation stage, which provides recommendations to an authorized human (e.g., manager) of reimbursement entity evaluates to make an ultimate decision regarding whether a to-be-determined expense report and/or individual transaction thereof should be approval, rejection, and/or escalated to a higher authority for an ultimate decision. In examples, intelligent computerized system 202 omits the recommendation stage and makes an ultimate machine determination regarding whether a to-be-determined expense report and/or individual transaction thereof is approved or rejected. Under some conditions, when intelligent computerized system 202 is operable to omit the recommendation stage, intelligent computerized system 202 may determine to escalate a to-be-determined expense report and/or individual transaction thereof to a higher authority (e.g., an authorized human, manager of reimbursement entity) for an ultimate decision, as is described further herein.

In examples, where intelligent computerized system 202 executes a recommendation stage, intelligent computerized system 202 generates recommendation report 249. Recommendation report 249 may include one or more recommendations indicating whether one or more to-be-determined expense report 244a-244n and/or individual transactions thereof. Example recommendations may include a recommendation for approval, recommendation for rejection, a recommendation for further review (e.g., flagged), and/or the like.

When determining a recommendation at the report level, intelligent computerized system 202 obtains the risk score and/or the aggregated risk score assigned to to-be-determined expense report 244a. Likewise, when determining a recommendation at the transaction level, intelligent computerized system 202 obtains the risk score assigned to a disaggregated individual transaction of to-be-determined expense report 244n. In examples, low risk scores, $S_L$, are defined as being within a low number range (e.g., $S_L$=0.0-0.2), and high risk scores, $S_H$, are defined as being within a high number range (e.g., $S_H$=0.8-1.0). Middle risk scores, $S_M$, are defined as being in between the low number range and high number range (e.g., $S_L < S_M < S_H$ where $0.2 < S_M < 0.8$). The reverse may be defined, if desired, given the scores are on opposite sides of a spectrum. The numbers themselves are arbitrary given that the number ranges are distinguishable from each other. The obtained risk score is compared to a risk score hierarchy, $S_L < S_M < S_H$, and based on the location of the obtained risk score within the risk score hierarchy, $S_L < S_M < S_H$, intelligent computerized system 202 determines whether recommendation report 249 will include a recommendation for approval, recommendation for rejection, and/or recommendation for further review (e.g., flagged).

For example, based on a first obtained risk score being 0.05, the first obtained risk score is determined to be a low risk score, and a recommendation of approval is generated for to-be-determined expense report 244a. In another example, based on a second obtained risk score being 0.7, the second obtained risk score is determined to be medium risk score, and a recommendation for review is generated for to-be-determined expense report 244b. In another example, based on a third obtained risk score being 0.85, the third obtained risk score is determined to be high risk score, and a recommendation of rejection is generated for to-be-determined expense report 244n.

Example recommendation reports 249 may include one recommendation, such as for one to-be-determined expense report 244a or recommendations for multiple to-be-determined expense reports 244b-244n. Recommendations of recommendation report 249 may be transaction level recommendations, also referred to as itemized transaction recommendations, report level recommendations, also referred to as itemized report recommendations, and/or a mixture thereof. Intelligent computerized system 202 may also include additional transaction specific information and/or additional report specific information, which is helpful to an authority (e.g., manager) when determining whether to approve, reject, and/or escalate one or more of the itemized transactions or reports of recommendation report 249.

Examples of additional transaction/report specific information include a determined risk score, the defined risk score hierarchy, $S_L < S_M < S_H$ to contextualize the determined risk score, feature data of the specific transaction or report, and/or attributes of the specific transaction or report. Further, intelligent computerized system may generate selectable links, attachments, and/or like, which are included within recommendation report 249, that responsive to selection on user device 248 by an authority (e.g., manager) cause information or documents (e.g., receipts, proof of purchases, credit card accounts, graphical representation of current and/or historical statistics, history information regarding a requesting entity and/or vendor of an itemized transaction or report, emails, indications of expense preapprovals, evidence (e.g., webpages) of a purchased item, evidence of (e.g., webpages) showing comparative items of a purchased item, evidence of (e.g., issued boarding pass, ticket stub, and/or the like) use of a purchased item, and/or the like) to be displayed by user device 248. The included links and/or attachments improve traditional expense report determination systems and methods by imbedding information resources within recommendation report 249 that allowing the authority (e.g., manager) to make a resolution decision (e.g., approve, reject, escalate, etcetera.) with an increased amount of information all without wasting time or resources by searching for the information, by launching other applications, or by leaving recommendation report 249.

Further, intelligent computerized system 202 may include, within recommendation report 249, user selectable resolution options (e.g., approval option, rejection option, escalation option, and/or the like) associated with specific itemized transactions and/or reports. Embedding user selectable resolution options within recommendation report 249 further improves traditional expense report determination systems and methods by allowing the authority (e.g., manager) to resolve an itemized transaction and report without wasting time or resources by leaving recommendation report 249. For example, if recommendation report 249 includes a plurality of itemized transactions and/or reports (hereinafter itemized item), the authority (e.g., manager) could approve one or more itemized item, reject one or more itemized item, and/or escalate one or more itemized item, all without leaving recommendation report 249, if desired.

Responsive to the user 247 selecting a resolution option of an itemized item, operations are executed based on which resolution option is selected. For example, responsive to an approval selection of an itemized report, approval operations are performed. For example, user 247 initiates reimbursement of the requesting entity. In instances, responsive to an approval selection of an itemized report, user device 248 and/or a remote processor (e.g., processor 206 or another processor (not shown)) generates and causes execution of one or more reimbursement commands 253 that reimburse the requesting entity by issuing a voucher for the requested hours off, days off, discounts, services, products, and/or the like, electronically adjusting an electronic record keeping or tracking mechanism (e.g., database, spreadsheet, software, table, log, etcetera) according to the requested hours off, days off, discounts, services, products, and/or the like, performing a service, transferring a product or other item, mailing a product or other item, issuing financial instrument (e.g., check) in the amount requested, initiating an automatic clearing house (ACH) transaction or electronic deposit in the amount requested, and/or transferring a debt from the requesting party to another party (e.g. reimbursing party), among others.

Sending computer generated reimbursement commands 253 that cause reimbursement execution, further improves traditional expense report determination systems and methods by minimizing reimbursement errors typically caused when reimbursement entities (e.g., user 247) mistakenly alter any information thereof, for example, transposing characters, selecting an erroneous requesting entity or account, inputting format errors, mistaking an identity, inputting typographical errors, and/or the like. Further, fraud is reduced because sending automatic computer-generated reimbursement commands 253 to cause reimbursement execution prevents user 247 and other individuals from nefariously altering information thereof, which prevents reimbursements from being redirected to nefarious individuals and/or accounts. Minimizing inadvertent and/or nefarious errors improves reimbursement accuracy, reduces the loss of money, decreases processing resources and network traffic dedicated to error corrections, reduces latency of the overall system and method, and leads to improved user satisfaction.

Further, responsive to a rejection selection of an itemized report of recommendation report 249, user device 248 and/or a remote processor (e.g., processor 206 or another processor (not shown)) generates a rejection message. An example rejection message may include any information, links, and/or attachments from recommendation report 249 associated with the rejected itemized item in addition to comments and/or additional information input by user 247. A rejection message may be sent to a requesting entity, a managing associate of reimbursing entity, and/or be stored in a local and/or remote memory of system 200. The rejection message may include one or more rejected itemized items, request correction of errors detected therein, may be combined with an escalation message if desired, and may request resubmission thereof for further consideration by intelligent computerized system 202.

Further still, responsive to an escalation selection of an itemized report of recommendation report 249, user device 248 and/or a remote processor (e.g., processor 206 or another processor (not shown)) generates an escalation message. An example escalation message may include any information, links, and/or attachments from recommendation report 249 associated with the escalated itemized item in addition to comments and/or additional information input by user 247. An escalation message may be sent to a requesting entity, a managing associate of reimbursing entity, and/or be stored in a local and/or remote memory of system 200. The escalation message may include one or more escalated itemized items, request correction of errors detected therein, and may be combined with a rejection message if desired.

The models may be updated periodically, upon detection of a threshold amount of new reference expense reports being stored within data repository 201, and/or upon detecting a threshold deterioration of accuracy of one or more of the machine learning models. Accuracy of a machine learning model may be determined by post sampling outputs from one or more of the machine learning model. The sampled outputs may be evaluated for accuracy, and an aggregation of the determined accuracy of the sampled outputs may be the machine learning model accuracy score. Upon an accuracy score falling below a defined accuracy threshold, intelligent computerized system 202 may trigger an updated training of machine learning model.

Responsive to the user 247 selecting selection of an itemized report of recommendation report 249, additional operations are executed, which further improve intelligent expense report determination systems and methods disclosed herein. Upon selection of an approved or rejected option, user device 248 and/or a remote processor (e.g., processor 206 or another processor (not shown)) generates resolved expense report message 251 including the itemized report and corresponding attributes and/or features thereof, including an indication of rejection and any other attributes/features discussed herein (e.g., the expense report and attributes including comments describing reasons for rejection). In examples, the generated resolved expense report message 251 may be sent to and stored in data repository 201 as a reference expense report.

Storing resolved expense report message 251, generated as described herein, as a reference expense report, further improves traditional expense report determination systems and methods by providing continuous and up-to-date feedback to data repository 201, which increases sample sizes available for machine training thereby improving the accuracy of machine learning models trained therewith. Further, contemporaneous feedback allows training data and machine learning models to reflect trends thereby making training data and machine learning models dynamic and customizable specific to each reimbursement entity, if desired.

Further, automatic computer generation and transmission of resolved expense report message 251, reimbursement commands 253, rejection messages, and escalation messages, further improves traditional expense report determination systems and methods by improving security of the entire system and communications therebetween. Any and/or all messages, reports, commands, information, origination and termination points, and memories of all systems and methods herein may be password protected and/or encrypted before, during, and after transmissions of information. Because various messages, commands, and reports are automatically generated by a processor, sensitive information therein such as, credit card information, bank account information, user credentials, and/or the like of a requesting entity, reimbursement entity, third party, and/or the like are protected from the eyes of user 247 and other humans (e.g., information technologies staff, support staff, accounting staff, managers, escalation authorities, and/or the like) of reimbursing entity and/or requesting entity. As such, preventing the exposure of sensitive information from anyone along the chain of reimbursement.

Further, communications between processors, entities, users, and/or memories may be encrypted thereby protecting sensitive information from being inadvertently or nefariously intercepted and misappropriated. Further still, due to the computer generation of each request, message, command, and the like along the reimbursement chain, blockchain record keeping may be appended to each step, providing yet another improvement over traditional expense report determination systems because expense report determination systems disclosed herein have increased integrity and reliability.

If desired, intelligent computerized system 202 may omit recommendation operations described herein, for example, creating and sending recommendation report 249 to user 247 soliciting approvals or rejections from user 247 based on recommendations and information of recommendation report 249. Omitting some or all user decisions, involvement, or interaction (e.g., human decisions, involvement, or interaction) from the time to-be-determined expense report 244*a* is received by intelligent computerized system 202 until a time after to-be-determined expense report 244*a* is approved or rejected further improves machine learning systems and methods described herein. Improvements are realized because significant processing resources are saved by omitting the generation of a recommendation report 249. The saved processing resources may be repurposed to convert reference expense reports into compatible training data more quickly, train machine learning models more quickly, and/or running trained machine learning models with input reference data and to-be-determined expense report 244*a* data.

Further improvements are realized because latency is reduced, for example, by avoiding any and all latency caused by waiting for a human to receive recommendation report 249, waiting for a human to open and review recommendation report 249, and waiting for a human to decide whether to approve or reject indexed items of recommendation report 249. This reduction of latency clears outstanding reimbursement requests quickly freeing up temporary storage locations, such as cache memories, queues, and the like. The reduction of latency also reduces account payables of reimbursement entities and reduces account receivables of requesting entities thereby increasing the reliability of each entities' accounting systems and methods.

In examples, recommendation operations described herein may be omitted when intelligent computerized system 202 is operational to to-be-determined expense report 244*a* based on a risk score and/or aggregated risk score assigned by a machine learning system described herein. Likewise, when determining a recommendation at the transaction level, intelligent computerized system 202 obtains the risk score assigned to a disaggregated individual transaction of example to-be-determined expense report 244n and determine whether to approve or reject the transaction based on a determined risk score.

Continuing the above example, one or more of the machine leaning models disclosed herein determines a risk score and intelligent computerized system compares the determined risk score to a risk score hierarchy, $S_L<S_M<S_H$. If desired, the risk score hierarchy may be defined differently when user (e.g., human) evaluation is omitted from the approval/rejection determination phase. For example, lower risk scores, $S_L$, may be defined as being within a low number range (e.g., $S_L$=0.0-0.08), and high risk scores, $S_H$, may be defined as being within a high number range (e.g., $S_H$=0.85-1.0). Middle scores, $S_M$, may be defined as being in between the low number range and high number range (e.g., $S_L<S_M<S_H$ where $0.08<S_M<0.85$). In examples, making the $S_L$ stricter may be desirable because issuing a false approval by a machine is more problematic than issuing a false rejection by a machine.

In other examples, reimbursing entity may define $S_H$ less strictly if speeding the resolution of to-be-determined expense requests is desirable for any reason. In examples, $S_L$ and $S_H$ may be dynamically selectable based on current circumstances of a specific reimbursement entity. For example, should a reimbursement entity desire speedier resolutions of to-be-determined expense requests (e.g., during a busy travel season, right before the end of a fiscal year, and/or during understaffing). Further, should a reimbursement entity desire increase scrutiny of to-be-determined expense requests (e.g., due to recently discovered fraud, after resolution of an understaffing issue, specifically for one or more flagged problem employees, recently laid off employees, and/or the like).

In an example operation, intelligent computerized system 202 determines the resolution of to-be-determined expense reports and/or disaggregated individual transactions based on the risk scores thereof as determined by a machine learning model described herein. Upon determining a first obtained risk score is 0.05, intelligent computerized system 202 compares the first obtained risk score to the defined risk score hierarchy (e.g., $S_L<S_M<S_H$ where $0.08<S_M<0.85$) and determines the first obtained risk score to be low risk score. Responsive to the low risk score determination, intelligent computerized system 202 approves the to-be-determined expense report or disaggregated individual transaction while omitting the human interaction discussed herein. Responsive to approving the to-be-determined expense report or disaggregated individual transaction, intelligent computerized system 202 stores in one or more local and/or remote memory the approval selection in association with corresponding information of the to-be-determined expense report or disaggregated individual transaction (e.g., feature data and/or attributes).

Further, intelligent computerized system 202 reimburses the requesting entity of the to-be-determined expense report or disaggregated individual transaction via computerized generated and transmitted operations, as discussed herein.

In another example, based on a second obtained risk score being 0.95, intelligent computerized system 202 compares the second obtained risk score to the defined risk score hierarchy (e.g., $S_L<S_M<S_H$ where $0.08<S_M<0.85$) and determines the second obtained risk score to be a high risk score. Responsive to the high risk score determination, intelligent computerized system 202 rejects the to-be-determined expense report and/or disaggregated individual transaction while omitting the human interaction described herein. Responsive to rejecting the to-be-determined expense report and/or disaggregated individual transaction, intelligent computerized system 202 stores in one or more local and/or remote memory the rejection selection in association with corresponding information of the to-be-determined expense report or disaggregated individual transaction (e.g., feature data and/or attributes including comments describing reasons for rejection), and a rejection report is as discussed herein.

Based on a third obtained risk score being 0.7, intelligent computerized system 202 determines the third obtained risk score to be of medium risk (e.g., moderate risk) and flags the to-be-determined expense report or disaggregated individual transaction for further review. In this example, intelligent computerized system 202 determines that some of the human interaction steps described herein may be desirable for resolution thereof. In examples, intelligent computerized system 202 creates recommendation report 249 including a recommendation for review (as described herein) and some or all the additional information described herein and sends recommendation report 249 to user device 248. This flagged to-be-determined expense report may be resolved as is described herein in examples that include user 247 (e.g., human) intervention.

Figure 4B:
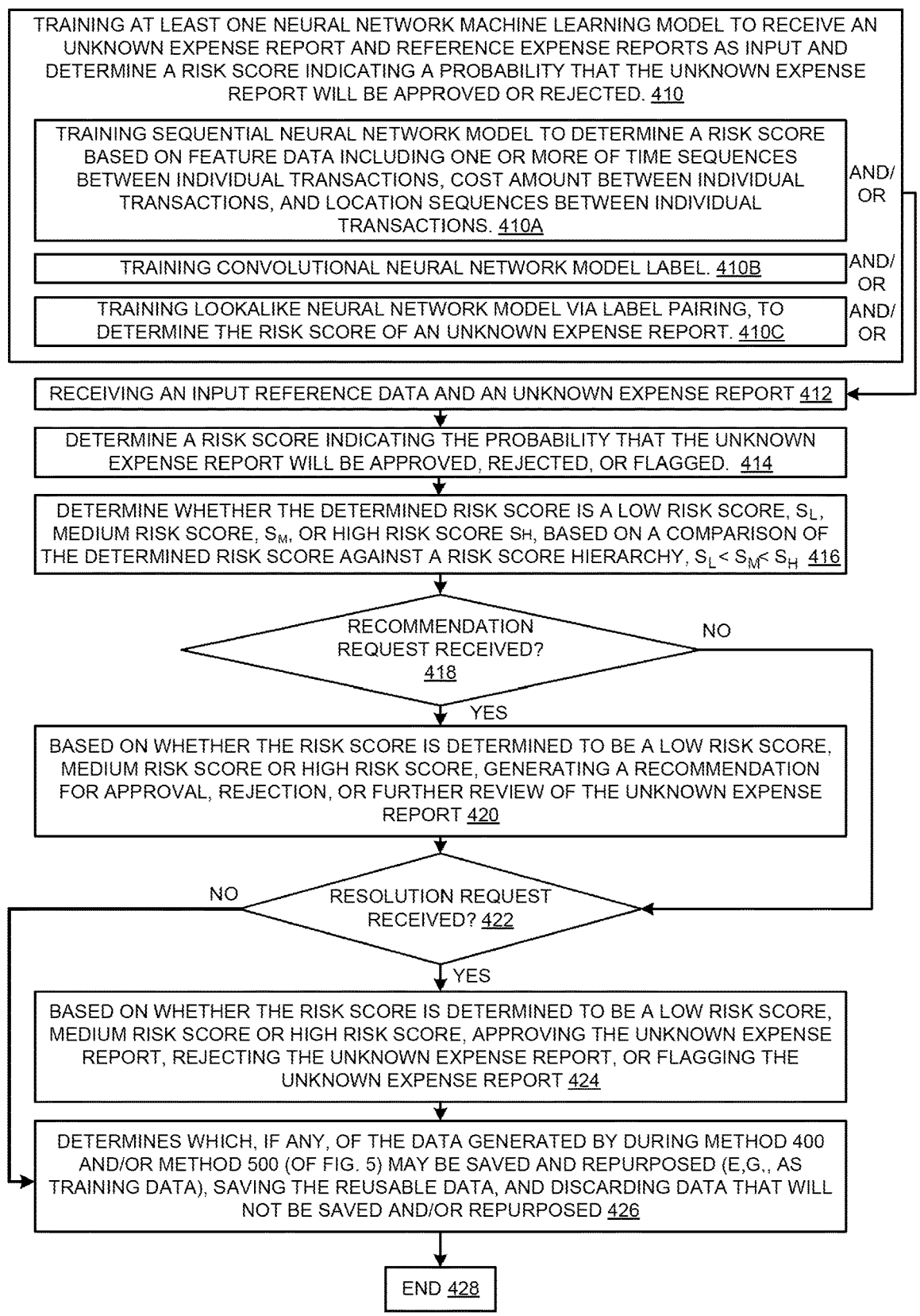

FIGS. 4A and 4B are flow charts illustrating an example computerized method 400 for intelligently performing expense report determinations. At operation 402, processor 206 receives an unbalanced sample comprising reference expense reports and corresponding attributes, wherein a reference expense report includes one or more individual transactions. For instance, processor 206 receives sample of reference expense reports 215 comprising reference expense reports 202a-202n and attributes 203a-203n corresponding to respective reference expense reports 202a-202n of the sample of reference expense reports 215, wherein a reference expense report 202a includes one or more individual transactions 304a-304n. A sample of reference expense reports 215 includes a plurality of reference expense reports 202a-202n of differing amounts of individual transactions (e.g., 304a-304n and 306a-306n), a majority group 218 of reference expense reports having a common approval history, and a minority group 222 of reference expense reports having a common rejected history, wherein the majority group 218 comprises a threshold disproportionate amount of reference expense reports as compared to the minority group 222.

At operation 404, processor 206 creates a balanced subsample from the received unbalanced sample by culling some of the reference expense reports from a majority group of the unbalanced subsample, wherein the balanced subsample comprises a number of reference expense reports within the balanced majority group that is within a threshold balanced amount compared to a number of reference expense reports within the balanced minority group. At operation 404a, processor 206 creates a balanced subsample from the majority group of the unbalanced subsample by clustering individual transactions of the majority group. At operation 404b, processor 206 selects cluster centroids, based on distance from a centroid, as the individual transactions of the balanced majority group; and at operation 404c, processor removes non-selected individual transactions from the majority group thereby creating the balanced majority group.

In an example of operations 404 and 404a-404c, processor 206 creates a balanced subsample 216 from the sample of reference expense reports 215 by culling some of the reference expense reports from the majority group 218, wherein the balanced subsample 216 comprises a number of reference expense reports within the balanced majority group 219 is within a threshold balanced amount compared to a number of reference expense reports within the balanced minority group 223. In example operation 405a, processor 206 clusters the individual transactions of the majority group 218. At operation 405b, processor 206 selects cluster centroids, based on distance from a centroid, as the individual transactions of the balanced majority group 219 of the balanced subsample 216. Further, at operation 405c, processor 206 culls others of the individual transactions from the majority group 218 of the sample of reference expense reports 215, thereby creating balanced majority group 219.

At operation 406, processor 206 extracts feature data of an individual transaction of a reference expense report of the balanced subsample based on attributes corresponding to the reference expense report. For instance, processor 206 extracts feature data 228a of an individual transaction 304a of a reference expense report 202a of the balanced subsample 216 based on attributes 203a corresponding to the reference expense report 202a.

At operation 407, processor 206 determines whether any more individual transactions of any reference expense report of the balanced subsample are lacking extracted feature data. If at operation 407, processor 206 determines that more individual transactions have unextracted features, then method 400 moves back to operation 406. For example, processor 206 repeats extraction of feature data 228b-228n for a plurality of individual transactions 304b-304n of the reference expense report 302a and other reference expense reports 302n of the balanced subsample 216. If at operation 407, processor 206 determines otherwise, then method 400 moves to operation 408.

At operation 408, processor 206 builds at least one neural network learning model, based at least on the extracted feature data 228a-228n. In operation 408a, processor 206 builds a sequential neural network model 225; at operation 408b, processor 206 builds a convolutional neural network model 227; and/or at operation 408c, processor builds lookalike neural network model 229.

At operation 410, processor 206 trains at least one neural network learning model to receive a to-be-determined expense report 244a and reference expense reports 202a-202n as input and determine a risk score indicating a probability that the to-be-determined expense report 244a will be approved or rejected. For example, at operation 410a, processor 206 trains sequential neural network model 225 to determine a risk score based on feature data a including one or more of time sequences between individual transactions, cost amounts between individual transactions, and location sequences between individual transactions.

At operation 410b, processor trains convolutional neural network model. In examples of operation 410a, processor 206 trains sequential neural network model 225 to determine the risk score based on feature data 228a including one or more of time sequences between individual transactions 304a-304b of a respective reference expense report 302a, cost amounts between individual transactions 304a-304b of respective reference expense report 302a, and location sequences between individual transactions of respective reference expense report 302a. At operation 410c, processor 206 trains lookalike neural network model 229 via label pairing, to determine the risk score of a to-be-determined expense report.

At operation 412, processor 206 receives input reference data and a to-be-determined expense report. At operation 414, processor 206 determines a risk score (e.g., transaction level risk score or aggregated risk score). At operation 414, processor 206 determines whether the determined risk score is a low risk score, $S_L$, medium risk score, $S_M$, or high risk score $S_H$, by comparing the determine risk score to a risk score hierarchy, $S_L < S_M < S_H$.

At operation 418, processor 206 determines whether a recommendation request was received for the to-be-determined expense report. If a recommendation was requested, at operation 420, based on whether the risk score was determined to be a low risk score, medium risk score, or high risk score at operation 414, processor 206 generates a recommendation for approval, rejection, or further review of the to-be-determined expense report. In examples, a risk score is indicative of the likelihood that the to-be-determined expense report includes error data as disclosed herein. If at operation 418 no recommendation was requested, method 400 moves to operation 422. In examples, after generating a recommendation for approval, rejection, or further review, a recommendation report 249 is created and send to user device 248 for consideration, as is described herein.

At operation 422, processor 206 determines whether a resolution request was received for the to-be-determined expense report. If a resolution was requested, at operation 424, based on whether the risk score was determined to be a low risk score, medium risk score, or high risk score, processor approves the to-be-determined expense report, rejects the to-be-determined expense report, or flags the to-be-determined expense report for further review.

If at operation 422 processor 206 determines no resolution request was received for the to-be-determined expense report, the method moves to operation 426, wherein the processor 206 determines which, if any, of the data generated by during method 400 and/or method 500 (explained herein) may be saved and repurposed (e.g., as training data), saves the reusable data, and discards data that will not be saved and/or repurposed. At operation 428, method 400 ends.

Figure 5:
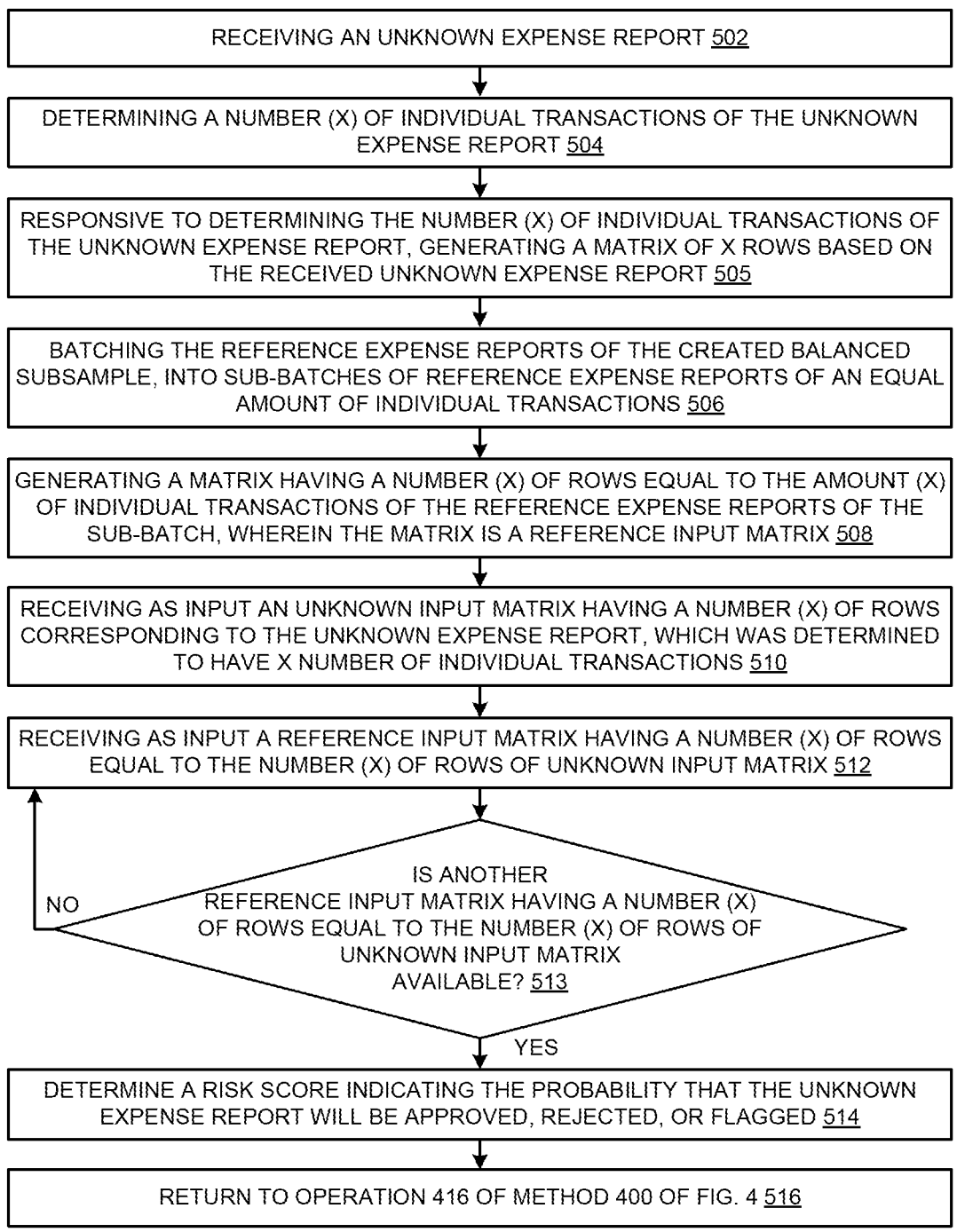
FIG. 5 is a flow chart illustrating a computerized method for determining a risk score via a convolutional neural network model according to an example.

FIG. 5 is a flow chart illustrating an example computerized method 500 for determining a risk score via a convolutional neural network model. In examples, method 500 may be inserted within operation 414 of method 400. At operation 502, processor 206 receives a to-be-determined expense report. At operation 504, processor 206 determines a number (x) of individual transactions of the to-be-determined expense report. In an example, to-be-determined expense report 244a comprises 4 individual transactions, with no more individual transactions and no fewer individual transactions, so x=4. In this example, processor 206 determines that to-be-determined expense report 244a comprises 4 individual transactions.

At operation 505, processor 206 generates a matrix based on the received to-be-determined expense report. The generated matrix is an input matrix and processor 206 generates input matrix to have a number (x) of rows equal to the number of transactions determined to be within the received to-be-determined expense report. In an example, because operation 504 determined that to-be-determined expense report has 4 individual transactions, no more individual transactions and no fewer individual transactions, x=4 and input matrix is generated to have 4 rows.

At operation 506, processor 206 batches the reference expense reports of the created balanced subsample, into sub-batches of reference expense reports of an equal amount of individual transactions. For instance, processor 206 may batch reference expense reports 202a-202n of the created balanced subsample 216, into sub-batches 232 of reference expense reports so that each batch includes an equal amount of individual transactions therein. For example, sub-batch$_a$ 234a may have x number of individual transactions, where x=4, so all reference expense reports of sub-batch$_a$ 234a have 4 individual transactions with no more individual transactions and no fewer individual transactions. In another example, sub-batch$_n$ 234n may have y number of individual transactions, where y=7, so all reference expense reports of sub-batch$_n$ 234n have 7 individual transactions with no more individual transactions and no fewer individual transactions. As explained herein, the sub-batching of operation 506 helps to create an input reference matrix of a desirable number of row (e.g., x rows or y rows), so processor 206 has an input reference matrix that has the same number of rows as a matrix created from a to-be-determined expense report. It is desirable that two matrices being input into a convolutional have the same number of rows, so convolutional may be performed without error.

At operation 508, processor 206 generates a matrix having a number (x) of rows equal to the amount (x) of individual transactions of the reference expense reports of the sub-batch, wherein the generated matrix is a reference input matrix. For instance, processor 206 determined that x=4 in a previous step, so processor 206 generates a matrix having 4 rows from a reference expense reports of sub-batch$_a$ 234a, each of which have 4 individual transactions. In examples, processor 206 generates multiple matrices 238a, one matrix for each reference expense report of sub-batch$_a$ 234a, wherein each matrix generated from a reference expense report of sub-batch$_a$ 234a has 4 rows because processor 206 determined that x=4 in this instance.

At operation 510, processor 206 receives as input, into a convolutional neural network model, this generates input matrix having a number (x) of rows corresponding to the number (x) of individual transactions within to-be-determined expense report. At operation 512, processor 206 receives as input, into a convolutional neural network model, a reference input matrix having a number (x) of rows equal to the number (x) of rows of input matrix.

At operation 513, processor 206 determines whether an additional reference input matrix having a number (x) of rows equal to the number (x) of rows of input matrix is available. For example, processor 206 determines whether another 4 row reference input matrix is available from matrices 238a. If another reference input matrix having a number (x) of rows equal to the number (x) of rows of input matrix is available, method 500 goes back to operation 514. If no more such reference input matrices are available, method 500 moves to operation 514.

At operation 514, processor 206 determines a risk score (e.g., indicating the probability that the to-be-determined expense report will be approved, rejected, or flagged). The determined risk score may be a transaction level risk score and/or aggregated risk score. In examples, at operation 516, method 500 may move to operation 416 of method 400 of FIGS. 4A and 4B.

Exemplary Operating Environment

Figure 6:
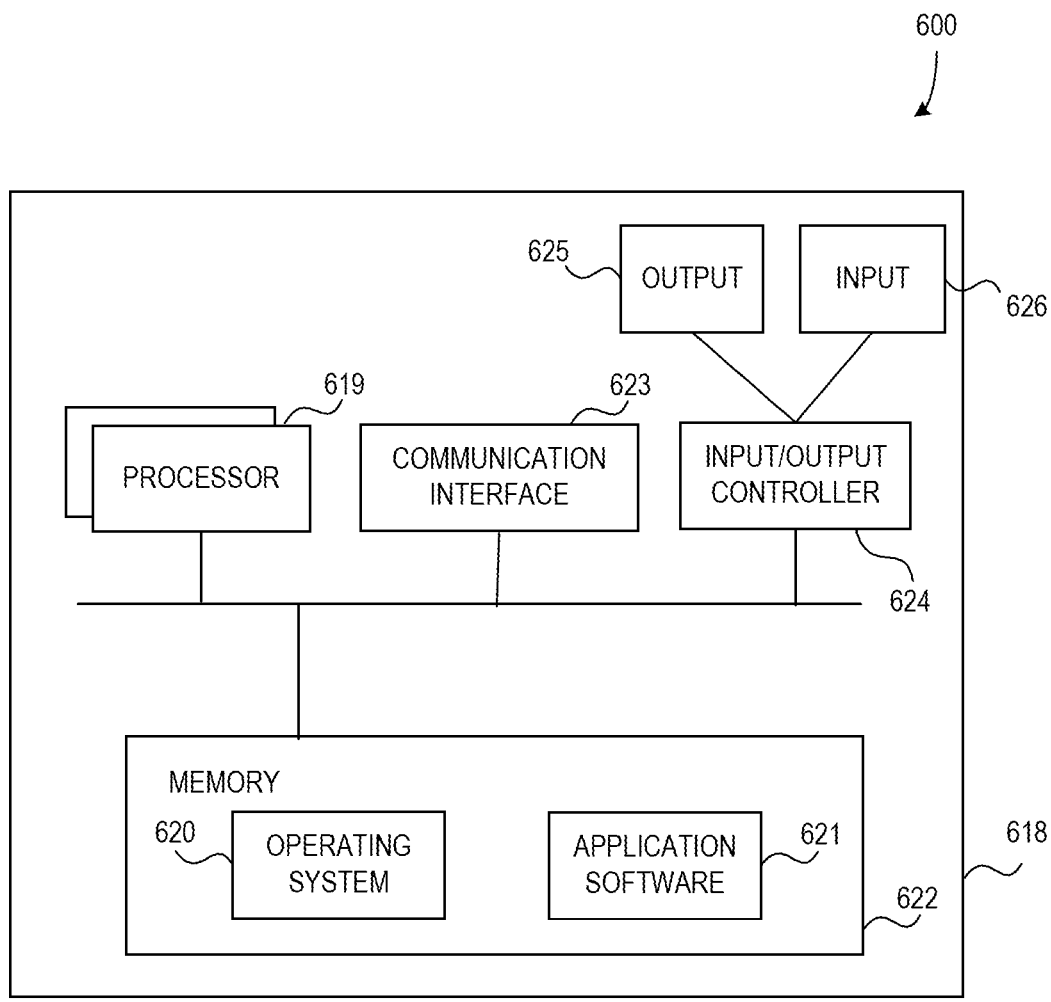
FIG. 6 illustrates a computing apparatus according to an example as a functional block diagram.

The present disclosure is operable with a computing apparatus according to an example as a functional block diagram 600 in FIG. 6. In an example, components of a computing apparatus 618 may be implemented as a part of an electronic device according to one or more examples described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer-readable instructions, data structures, program systems or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer-readable instructions, data structures, program systems, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone, or a touchpad. In one example, the output device 625 may also function as the input device. An example of such a device may be a touch sensitive display. The input/output controller 624 may also output data to devices other than the output device, e.g. a locally connected printing device. In some examples, a user may provide input to the input device(s) 626 and/or receive output from the output device(s) 625.

The functionality described herein can be performed, at least in part, by one or more hardware logic components. According to an example, the computing apparatus 618 is configured by the program code when executed by the processor 619 to execute the examples of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in a plurality of ways, including from input devices such as a keyboard or pointing device, via gesture input, proximity input (such as by hovering), and/or via voice input.

Examples of the disclosure may be described in the general context of computer executable instructions, such as program systems, executed by one or more computers or other devices in software, firmware, hardware, or a combination thereof. The computer executable instructions may be organized into one or more computer executable components or systems. Generally, program systems include, but are not limited to, routines, programs, objects, components, and data structures that perform particular tasks or implement particular abstract data types. Aspects of the disclosure may be implemented with any number and/organization of such components or systems. For example, aspects of the disclosure are not limited to the specific computer executable instructions or the specific components or systems illustrated in the figures and described herein. Other examples of the disclosure may include different computer executable instructions or components having more or less functionality than illustrated and described herein.

In examples involving a general purpose computer, aspects of the disclosure transform the general purpose computer into a special purpose computing device when configured to execute the instructions described herein.

An example computerized system intelligently trains a computer to perform expense report determinations. The computerized system comprises at least one memory; and at least one processor coupled to the at least one memory. The at least one processor adapted to at least receive an unbalanced sample comprising a plurality of reference expense reports of differing amounts of individual transactions, and attributes corresponding to respective reference expense reports of the plurality of reference expense reports. The unbalanced sample is imbalanced due to comprising a majority group of reference expense reports having a common approval history, and a minority group of reference expense reports having a common rejected history, wherein the majority group comprises a threshold disproportionate amount of reference expense reports as compared to the minority group. The at least one processor is also adapted to create a balanced subsample from the unbalanced sample by culling select reference expense reports of the majority group, wherein the balanced subsample comprises a balanced majority group having a number of reference expense reports within a threshold balanced amount as compared to a number of reference expense reports within the minority group. The at least one processor executes a feature extractor, which is adapted to at least extract feature data of the individual transactions of the reference expense reports of the balanced subsample based on the attributes corresponding to respective reference expense reports. Further, the at least one processor builds at least one neural network learning model based at least on the extracted feature data and trains the at least one neural network learning model to receive, as input, a to-be-determined expense report and the reference expense reports of the balanced subsample; based on the training, determine a risk score indicative of a probability that the to-be-determined expense report will be rejected as having error data; create an interactive recommendation that displays the determined risk score of the to-be-determined expense report, wherein the interactive recommendation accepts, as input, an indication that the to-be-determined expense report is approved, rejected, or flagged.

A computerized method for intelligently training a computer to perform expense report determinations comprises receiving an unbalanced sample that comprises a plurality of reference expense reports of differing amounts of individual transactions, and attributes corresponding to respective reference expense reports of the plurality of reference expense reports. The unbalanced sample is imbalanced due to comprising: a majority group of reference expense reports having a common approval history, and a minority group of reference expense reports having a common rejected history, wherein the majority group comprises a threshold disproportionate amount of reference expense reports as compared to the minority group. The method further comprising creating a balanced subsample from the unbalanced sample by culling select reference expense reports of the majority group, wherein the balanced subsample comprises a balanced majority group having a number of reference expense reports within a threshold balanced amount as compared to a number of reference expense reports within the minority group and extracting feature data of the individual transactions of the reference expense reports of the balanced subsample based on the attributes corresponding to respective reference expense reports. Further still, the method includes building at least one neural network learning model based at least on the extracted feature data; and training the at least one neural network learning model to receive, as input, a to-be-determined expense report and the reference expense reports of the balanced subsample; based on the training, determining, without user input, a risk score indicative of a probability that the to-be-determined expense report includes error data; and based on the determined risk score, approving, without user input, reimbursement of the to-be-determined expense report.

One or more non-transitory computer storage media have computer executable instructions for intelligently controlling resolution seeking inquiries that, upon execution by at least one processor, cause the at least one processor to perform at least receiving an unbalanced sample that comprises a plurality of reference expense reports of differing amounts of individual transactions, and attributes corresponding to respective reference expense reports of the plurality of reference expense reports. The unbalanced sample is imbalanced due to comprising: a majority group of reference expense reports having a common approval history, and a minority group of reference expense reports having a common rejected history, wherein the majority group comprises a threshold disproportionate amount of reference expense reports as compared to the minority group. The method further comprising creating a balanced subsample from the unbalanced sample by culling select reference expense reports of the majority group, wherein the balanced subsample comprises a balanced majority group having a number of reference expense reports within a threshold balanced amount as compared to a number of reference expense reports within the minority group and extracting feature data of the individual transactions of the reference expense reports of the balanced subsample based on the attributes corresponding to respective reference expense reports. Further still, the method includes building at least one neural network learning model based at least on the extracted feature data; and training the at least one neural network learning model to receive, as input, a to-be-determined expense report and the reference expense reports of the balanced subsample; responsive to the training, determining a risk score indicative of a probability that the to-be-determined expense report will be approved or rejected based on error data; and creating an interactive recommendation that displays the determined risk score of the to-be-determined expense report, wherein the interactive recommendation accepts, as input, an indication that the to-be-determined expense report is approved, rejected, or flagged.

Alternatively, or in addition to the other examples described herein, examples include any combination of the following:
  wherein the balanced subsample is created according to the at least one processor being further adapted to: cluster the individual transactions of the majority group; select cluster centroids, based on distance from a centroid, as the individual transactions of the majority group of the subsample; and cull others of the individual transactions from the majority group of the subsample.
  wherein the at least one processor is further adapted to at least: batch the reference expense reports of the balanced subsample, into sub-batches of reference expense reports of an equal amount of individual transactions; and based on a sub-batch of the sub-batches, create/generate reference input matrices having a number of rows equal to the amount of individual transactions of the reference expense reports of the sub-batch, wherein the reference expense reports received as input by the at least one neural network learning model is received as the created reference input matrices.
  wherein the at least one processor is further adapted to at least: create/generate an input matrix having a number of rows equal to the amount of individual transactions of the to-be-determined expense report, wherein the created reference input matrices received as the input by the at least one neural network learning model have the number of rows equal to the amount of individual transactions of the to-be-determined expense report; and determine the risk score indicating the probability that the to-be-determined expense report will be approved or rejected.
  wherein the built at least one neural network learning model is a sequential neural network model trained to determine the risk score based on at least some of the extracted feature data including one or more of: time sequences between individual transactions of a respective reference expense report, cost amounts between individual transactions of a respective reference expense report, and location sequences between individual transactions of a respective reference expense report.
  wherein the built at least one neural network learning model is a lookalike neural network model trained, via label pairing, to determine the risk score of a to-be-determined expense report.
  wherein the majority group comprises approved reference expense report and the minority group comprises rejected reference expense reports.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all the stated problems or those that have any or all the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer-readable medium, in hardware programmed or designed to perform the operations, or both. For example, aspects of the disclosure may be implemented as a system-on-a-chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized system for intelligently training a computer to perform expense report determinations, the computerized system comprising:
    at least one memory; and
    at least one processor coupled to the at least one memory, the at least one processor adapted to at least:
    receive an unbalanced sample comprising:
        a plurality of reference expense reports of differing amounts of individual transactions, and
        attributes corresponding to respective reference expense reports of the plurality of reference expense reports,
        wherein the unbalanced sample is imbalanced due to conditions comprising:
            a majority group of reference expense reports having a common approval history, and
            a minority group of reference expense reports having a common rejected history, wherein the majority group exceeds a threshold value of reference expense reports as compared to the minority group;
    create a balanced subsample from the unbalanced sample by culling select reference expense reports of the majority group, wherein the balanced subsample comprises a balanced majority group having a number of reference expense reports below a threshold value as compared to a number of reference expense reports within the minority group;
    extract feature data of the individual transactions of the reference expense reports of the balanced subsample based on the attributes corresponding to respective reference expense reports;
    build at least one neural network learning model using at least the extracted feature data;
    train the at least one neural network learning model to receive, as input, a to-be-determined expense report and the reference expense reports of the balanced subsample;
    receive a to-be-determined expense report and the reference expense reports of the balanced subsample as inputs to the trained at least one neural network learning model;
    based on the inputs, determine a risk score indicative of a probability that the to-be-determined expense report will be rejected as having error data; and
    create an interactive recommendation that displays the determined risk score of the to-be-determined expense report, wherein the interactive recommendation accepts, as input, an indication that the to-be-determined expense report is approved, rejected, or flagged.

2. The computerized system of claim 1, wherein the balanced subsample is created according to the at least one processor being further adapted to:
    cluster the individual transactions of the majority group;
    select cluster centroids, based on distance from a centroid of the clustered individual transactions, as the individual transactions of the majority group of the subsample; and
    cull others of the individual transactions from the majority group of the subsample.

3. The computerized system of claim 1, wherein the at least one processor is further adapted to at least:
    batch the reference expense reports of the balanced subsample into sub-batches of reference expense reports of an equal amount of individual transactions; and
    based on a sub-batch of the sub-batches, create reference input matrices having a number of rows equal to the amount of individual transactions of the reference expense reports of the sub-batch,
    wherein the reference expense reports received as input by the at least one neural network learning model are received as the created reference input matrices.

4. The computerized system of claim 3, wherein the at least one processor is further adapted to at least:
    create an input matrix having a number of rows equal to the amount of individual transactions of the to-be-determined expense report,
    wherein the created reference input matrices received as the input by the at least one neural network learning model have the number of rows equal to the amount of individual transactions of the to-be-determined expense report; and
    determine the risk score indicating the probability that the to-be-determined expense report will be rejected.

5. The computerized system of claim 1, wherein the at least one neural network learning model is a sequential neural network model trained to determine the risk score based on at least some of the extracted feature data including one or more of:
    time sequences between individual transactions of a respective reference expense report, cost amounts between individual transactions of a respective reference expense report, and
    location sequences between individual transactions of a respective reference expense report.

6. The computerized system of claim 1, wherein the at least one neural network learning model is a lookalike neural network model trained, via label pairing, to determine the risk score of the to-be-determined expense report.

7. The computerized system of claim 1, wherein the majority group comprises approved reference expense reports and the minority group comprises rejected reference expense reports.

8. A computerized method for intelligently training a computer to perform expense report determinations, the method comprising:
    receiving an unbalanced sample comprising:
        a plurality of reference expense reports of differing amounts of individual transactions, and
        attributes corresponding to respective reference expense reports of the plurality of reference expense reports,
        wherein the unbalanced sample is imbalanced due to conditions comprising:
            a majority group of reference expense reports having a common approval history, and a minority group of reference expense reports having a common rejected history, wherein the majority group exceeds a threshold value of reference expense reports as compared to the minority group;

creating a balanced subsample from the unbalanced sample by culling select reference expense reports of the majority group, wherein the balanced subsample comprises a balanced majority group having a number of reference expense reports below a threshold value as compared to a number of reference expense reports within the minority group;

extracting feature data of the individual transactions of the reference expense reports of the balanced subsample based on the attributes corresponding to respective reference expense reports;

building at least one neural network learning model using at least the extracted feature data;

training the at least one neural network learning model to receive, as input, a to-be-determined expense report and the reference expense reports of the balanced subsample;

receiving a to-be-determined expense report and the reference expense reports of the balanced subsample as inputs to the trained at least one neural network learning model;

based on the inputs, determining, without user input, a risk score indicative of a probability that the to-be-determined expense report includes error data; and based on the determined risk score being a low risk score, approving, without user input, reimbursement of the to-be-determined expense report.

9. The computerized method of claim 8, wherein the balanced subsample is created at least by:

clustering the individual transactions of the majority group;

selecting cluster centroids, based on distance from a centroid of the clustered individual transactions, as the individual transactions of the majority group of the subsample; and culling others of the individual transactions from the majority group of the subsample.

10. The computerized method of claim 8, further comprising:

batching the reference expense reports of the balanced subsample, into sub-batches of reference expense reports of an equal amount of individual transactions; and based on a sub-batch of the sub-batches, creating reference input matrices having a number of rows equal to the amount of individual transactions of the reference expense reports of the sub-batch, wherein the reference expense reports received as input by the at least one neural network learning model are received as the created reference input matrices.

11. The computerized method of claim 10, wherein the at least one neural network learning model is further trained according to:

creating an input matrix having a number of rows equal to the amount of individual transactions of the to-be-determined expense report, wherein the created reference input matrices received as the input by the at least one neural network learning model have the number of rows equal to the amount of individual transactions of the to-be-determined expense report; and determining the risk score indicating the probability that the to-be-determined expense report will be approved.

12. The computerized method of claim 8, wherein the at least one neural network learning model is a sequential neural network model trained to determine the risk score based on at least some of the extracted feature data including one or more of:

time sequences between individual transactions of a respective reference expense report, cost amounts between individual transactions of a respective reference expense report, and location sequences between individual transactions of a respective reference expense report.

13. The computerized method of claim 8, wherein the at least one neural network learning model is a lookalike neural network model trained, via label pairing, to determine the risk score of the to-be-determined expense report.

14. The computerized method of claim 8, wherein the majority group comprises approved reference expense report and the minority group comprises rejected reference expense reports.

15. One or more non-transitory computer storage media having computer executable instructions for intelligently controlling resolution seeking inquiries, upon execution by at least one processor, cause the at least one processor to perform at least:

receiving an unbalanced sample comprising:
a plurality of reference expense reports of differing amounts of individual transactions, and
attributes corresponding to respective reference expense reports of the plurality of reference expense reports, wherein the unbalanced sample is imbalanced due to conditions comprising:
a majority group of reference expense reports having a common approval history, and
a minority group of reference expense reports having a common rejected history, wherein the majority group exceeds a threshold value of reference expense reports as compared to the minority group;

creating a balanced subsample from the unbalanced sample by culling select reference expense reports of the majority group, wherein the balanced subsample comprises a balanced majority group having a number of reference expense reports below a threshold value as compared to a number of reference expense reports within the minority group;

extracting feature data of the individual transactions of the reference expense reports of the balanced subsample based on the attributes corresponding to respective reference expense reports;

building at least one neural network learning model using at least the extracted feature data;

training the at least one neural network learning model to receive, as input, a to-be-determined expense report and the reference expense reports of the balanced subsample;

receiving a to-be-determined expense report and the reference expense reports of the balanced subsample as inputs to the trained at least one neural network learning model;

responsive to the inputs, determining a risk score indicative of a probability that the to-be-determined expense report will be approved or rejected based on error data; and creating an interactive recommendation that displays the determined risk score of the to-be-determined expense report, wherein the interactive recommendation accepts, as input, an indication that the to-be-determined expense report is approved, rejected, or flagged.

16. The one or more non-transitory computer storage media of claim 15, wherein creating the subsample comprises:
    clustering the individual transactions of the majority group;
    selecting cluster centroids, based on distance from a centroid of the clustered individual transactions, as the individual transactions of the majority group of the subsample; and
    culling others of the individual transactions from the majority group of the subsample.

17. The one or more non-transitory computer storage media of claim 15, further causing the at least one processor to perform at least:
    batching the reference expense reports of the balanced subsample, into sub-batches of reference expense reports of an equal amount of individual transactions; and
    based on a sub-batch of the sub-batches, creating reference input matrices having a number of rows equal to the amount of individual transactions of the reference expense reports of the sub-batch,
    wherein the reference expense reports received as input by the at least one neural network learning model are received as the created reference input matrices.

18. The one or more non-transitory computer storage media of claim 17, wherein the at least one neural network learning model is further trained to:
    create an input matrix having a number of rows equal to the amount of individual transactions of the to-be-determined expense report,
    wherein the created reference input matrices received as the input by the at least one neural network learning model have the number of rows equal to the amount of individual transactions of the to-be-determined expense report; and
    determine the risk score indicating the probability that the to-be-determined expense report will be approved or rejected.

19. The one or more non-transitory computer storage media of claim 15, wherein the at least one neural network learning model is a sequential neural network model trained to determine the risk score based on at least some of the extracted feature data including one or more of:
    time sequences between individual transactions of a respective reference expense report, cost amounts between individual transactions of a respective reference expense report, and
    location sequences between individual transactions of a respective reference expense report.

20. The one or more non-transitory computer storage media of claim 15, wherein the at least one neural network learning model is a lookalike neural network model trained, via label pairing, to determine the risk score of the to-be-determined expense report.

* * * * *